US012751876B2

(12) United States Patent
Morin et al.

(10) Patent No.: US 12,751,876 B2
(45) Date of Patent: Oct. 6, 2026

(54) SIDERAIL FOR A BED FOR A PATIENT

(71) Applicant: UMANO MEDICAL INC., L'Islet (CA)

(72) Inventors: Marco Morin, Lévis (CA); Charles Pellerin, Québec (CA); Simon Dubé, Lévis (CA)

(73) Assignee: UMANO MEDICAL INC., L'Islet (CA)

( * ) Notice: Subject to any disclaimer, the term of this patent is extended or adjusted under 35 U.S.C. 154(b) by 364 days.

(21) Appl. No.: 18/548,482

(22) PCT Filed: Mar. 1, 2022

(86) PCT No.: PCT/IB2022/051813
§ 371 (c)(1),
(2) Date: Aug. 30, 2023

(87) PCT Pub. No.: WO2022/185218
PCT Pub. Date: Sep. 9, 2022

(65) Prior Publication Data

US 2024/0164964 A1 May 23, 2024

Related U.S. Application Data

(60) Provisional application No. 63/154,911, filed on Mar. 1, 2021.

(51) Int. Cl.
*A61G 7/05* (2006.01)
*A61G 7/002* (2006.01)

(52) U.S. Cl.
CPC .......... *A61G 7/0509* (2016.11); *A61G 7/0506* (2013.01); *A61G 7/0514* (2016.11); *A61G 7/002* (2013.01)

(58) Field of Classification Search
CPC .......... A61G 7/00; A61G 7/05; A61G 7/0509; A61G 7/0506; A61G 7/0514; A61G 7/002; A61G 7/015; A61G 7/0524
See application file for complete search history.

(56) References Cited

U.S. PATENT DOCUMENTS 5,370,246 A * 12/1994 Traynor ............... A61G 7/0503 5/503.1
D427,465 S * 7/2000 Thom ............................ D6/718
(Continued)

FOREIGN PATENT DOCUMENTS

CA 2902544 A1 2/2016
CN 204192107 U 3/2015
(Continued)

*Primary Examiner* — Fredrick C Conley
(74) *Attorney, Agent, or Firm* — STEPTOE LLP; Scott Richey

(57) ABSTRACT

A siderail for a bed for a patient. The bed extends longitudinally along a longitudinal axis between a head or rear end and a foot or front end and extending transversely along a transversal axis between a left side and right side, the bed comprising a patient support assembly comprising a patient surface for supporting the patient, and a frame, the patient support assembly being mounted to the frame. The siderail comprises an inner wall for facing the patient surface, an outer wall opposite the inner wall, a bottom edge, and a top edge. The siderail also comprises an inner projection extending upwardly and being spaced from the inner wall, the inner projection comprising an inner surface facing the inner wall, wherein a hollow space to receive an electronic device is defined between the inner surface of the inner projection and a portion of the inner wall.

32 Claims, 26 Drawing Sheets

(56) References Cited

U.S. PATENT DOCUMENTS

| | | | | |
|---|---|---|---|---|
| 6,240,580 | B1 | 6/2001 | Hamilton et al. | |
| 6,253,399 | B1 * | 7/2001 | Wagner | A47B 23/025 5/503.1 |
| 2006/0056616 | A1 * | 3/2006 | Heimbrock | A61G 7/0524 379/428.01 |
| 2007/0157385 | A1 | 7/2007 | Lemire et al. | |
| 2007/0180616 | A1 * | 8/2007 | Newkirk | A61G 7/0524 5/658 |
| 2011/0010854 | A1 * | 1/2011 | Zerhusen | A61G 7/0509 29/402.01 |
| 2011/0247135 | A1 | 10/2011 | Herman et al. | |
| 2011/0247137 | A1 * | 10/2011 | Herman | A61G 7/018 5/503.1 |
| 2012/0090091 | A1 * | 4/2012 | Hookway | A47B 23/046 5/425 |
| 2015/0164722 | A1 * | 6/2015 | Roussy | A61G 7/0514 5/430 |
| 2021/0330526 | A1 | 10/2021 | Kennedy et al. | |
| 2023/0310239 | A1 | 10/2023 | Kennedy et al. | |

FOREIGN PATENT DOCUMENTS

| | | | |
|---|---|---|---|
| CN | 110507109 | A | 11/2019 |
| CN | 213373207 | U | 6/2021 |
| GB | 2594251 | A | 10/2021 |

* cited by examiner

SIDERAIL FOR A BED FOR A PATIENT

CROSS-REFERENCE TO RELATED APPLICATIONS

The present application is a national stage entry application under 35 U.S.C. § 371 of International Patent Application PCT/IB2022/051813, filed on Mar. 1, 2022, which claims the benefit of U.S. Provisional Patent Application Ser. No. 63/154,911 filed on Mar. 1, 2021. Each of these earlier application is incorporated herein by reference in its entirety.

FIELD

A siderail for a bed comprising a patient support surface, the siderail comprising a panel comprising an inner face facing the patient support surface, an outer face opposed to the inner face, and a hollow space defined by wall portions of the inner face to receive an electronic device.

BACKGROUND

Beds and other types of patient support apparatuses are usually provided with specialized features to assist medical personnel in providing care for patients. A hospital bed typically comprises a patient support surface on which a patient can lie down and a plurality of barriers or siderails disposed around the patient support surface. Usually, the siderails can be lowered to allow the patient to be easily placed on the patient support surface, and then raised to prevent the patient from falling from the patient support surface or from getting out of the bed.

Furthermore, the siderails must be configured and positioned relative to the patient support surface so as to allow free and unobstructed movement of the various articulated sections of the patient support surface (e.g. a backrest portion, a seating or thigh portion and a leg portion pivotably attached to one another) when these various articulated sections are to be moved to position the patient (e.g. in seating or reclined positions) while still accomplishing safely the barrier function. As such, siderails are typically mounted about the periphery of the articulated patient support surface, and are often provided with a mounting system allowing the siderails to move toward the patient support surface when they are raised and away from the patient support surface when the siderails are lowered.

On the other hand, the technology relating to handheld personal electronic devices such as smart phones and tablets has significantly changed the habits of the overall population. These types of devices have become personal entertainment centers, communications tools, game centers, personal computers, internet access, newspapers, and plays many other functions. As such, when patients are hospitalized, they tend to bring with them their handheld personal electronic devices, which are now almost entirely replacing some of the equipment traditionally found in hospital rooms (e.g. radio, televisions, telephones).

As most of the beds currently in hospitals and health care facilities were developed prior to the advent of the smart phone and personal handheld device technologies, the vast majority of the beds currently being used are not configured to store the smart phones or tablets while they are not being used by the patient. And since the patient has reduced mobility, the number of options for leaving the phone when it is not being used are pretty much limited to putting it on top of the bedside table (when such bedside table is actually present) or on top of the patient support surface. In the former case, it can be challenging for the patient to access his/her smartphone or tablet when desired and there are risks of such smartphone/tablet being forgotten or lost when the bed is moved. In the latter case, it may create discomfort and the smartphone or tablet risks falling between the mattress and the siderail as the patient moves in the bed, and risks being lost and/or damaged when the siderails are moved from the raised position to the lower position.

As the bed is moved from one room to the other, it is thus desirable to ensure that the storing compartment be located on the bed. However, this poses a challenge. First, the siderail compartments of the art tend to include a number of components or structures impairing the access to the bottom or all parts of the compartment, thus making more cumbersome the cleaning and disinfection of the compartment. Second, some of the known compartment configurations include retaining elements projecting from the inner face of the siderail toward the patient support surface, thus requiring more space to allow free movement of the siderail between the lowered and raised position, which tends to create an undesirable gap between the mattress surface and the siderail. Also, the known compartments tend not to be adapted to receive a smart phone or a tablet while allowing their connection to a cable, for instance a cable connected to a power outlet for recharging such smart phone or tablet. Further, with the great variety of sizes and shapes of the various personal handheld devices on the market, some of the compartments may be adapted to receive and support one type of apparatus (e.g. smart phones which are typically smaller) but not some other types (e.g. tablets which are typically larger).

Furthermore, one of the challenges associated with the housing of smartphones and tablets on the hospital bed (whether it is in a storage compartment, on the patient support surface or elsewhere on the bed) is the very presence of the electric cable required to recharge the electronic device. When such electric cable is connected to a power outlet on the wall of the hospital room and extend into the bed to connect the electronic device, movement of the bed toward another room might be impaired by the presence of the cable, the cable can be damaged, or the health care professional must disconnect the cable from the power outlet to avoid those situations.

Furthermore, the presence of the electric cable may impair the movement of the siderails between the lowered and raised position or the articulated portions of the patient support surface as the electric cable may jam the siderail pivoting mechanism or other components of the bed when they are moved. To avoid such problems, line management areas are known, which could arguably be used to manage the electric cable to provide a defined area where the cables are constrained while allowing movement of the siderails and/or of the articulated sections of the patient support apparatus. The known configurations tend to be suitable with lines (e.g. oxygen lines, EGC lines and the like) because they are configured to allow a sliding movement of the lines in the line management area upon movement of the components of the bed but they remain retained or constrained in the line management area because they are permanently attached to the patient or to a component of the bed, and therefore cannot fall out of the line management area by gravity. With electric cable such as recharge cable for smartphones or tablets however, this is not the case. Indeed, recharge cable are typically disconnected from the smartphone or tablet when the batteries are sufficiently charged, and the gravity suffices to cause the cable to fall off the bed and/or of a line management area as they are currently known.

FIGS. 1 to 3 show a bed known in the art. The bed 100 comprises a head or rear end 102, an opposite foot or front end 104 and left and right sides 105, 107 extending longitudinally between the head end 102 and the foot end 104.

The bed 100 includes a base 106, a patient support assembly 108 and an elevation system 110 operatively coupling the patient support assembly 108 to the base 106. In the illustrated embodiment, the base 106 is provided with a displacement assembly which includes a plurality of casters 114 connected to the base 106 by pivots (not shown). These casters 114 allows the bed 100 to be moved and maneuvered along a floor or a surface.

The elevation system 110 is configured to raise and lower the patient support assembly 108 relative to the base 106 between a minimum or fully lowered position and a maximum or fully raised position. In one embodiment, the elevation system 110 is further configured to allow the patient support assembly 108 to be set at any intermediate position between the fully lowered and fully raised positions. The elevation system 110 may further be configured to tilt the patient support assembly 108 in various orientations, as will be further explained below.

The bed 100 further includes a patient support barrier system 120 generally disposed around the patient support assembly 108. The barrier system 120 includes a plurality of barriers which extend generally vertically around the patient support assembly 108. In the illustrated embodiment, the plurality of barriers includes a headboard 122 located at the head end 102 and a footboard 124 disposed generally parallel to the headboard 122 and located at the foot end 104 of the bed 100. The plurality of barriers further include spaced-apart left and right head siderail assemblies 126, 128 which are located adjacent the headboard 122 and spaced-apart left and right foot siderail assemblies 130, 132 which are respectively located between the left and right head siderail assemblies 126, 128 and the foot end 104 of the bed 100.

Each one of the plurality of siderails 126, 128, 130, 132 is moveable between an extended or raised position for preventing the patient lying on the bed 100 from moving laterally out of the bed 100, and a retracted or lowered position for allowing the patient to move or be moved laterally out of the bed 100.

The patient support assembly 108 includes a frame 200 and a patient support surface 250 supported by the frame 200. A lying surface such as a mattress or the like (not shown) is typically provided on the patient support surface 250 for receiving the patient thereon. In the illustrated embodiment, the patient support surface 250 includes a plurality of adjacent body support panels or articulated support sections which could be angled relative to each other to place the bed 100 in different configurations. Alternatively, the patient support surface 250 could include a single body support panel.

The frame 200 includes a pair of longitudinal frame members and a plurality of transversal frame members extending between the longitudinal frame members. Provided on one or both longitudinal frame member is a power outlet that may be used for connecting a personal handheld electronic device such as a smartphone, a tablet, a videogame console, a personal digital assistant (PDA), a mobile audio or video player, a camera, wearable computers (e.g. smart watches, fitness trackers, smart glasses, headsets, necklaces, rings) and the like (see, for instance, electronic devices such as smart phone and tablet), and providing electrical power thereto via an electrical cable such as a USB cable, as it will be described in greater detail below. The power outlet comprises at least one USB outlet or any other type of outlet or socket capable of relaying electrical power and/or data to a removable cable, whether through a wired connection or a wireless connection. The removable cable is configured to have a bed end configured for engaging the power outlet of the bed 100 and a device end configured to engage the socket of the electronic device. The electrical cable is an electrical cable of standard length of 36 inches for instance, although it will be appreciated that any other length could also be suitable. It will further be appreciated that adaptors could be used to mate and/or render compatible a cable with the bed 100 and/or electronic device ends of the electrical cable that are different than those of the bed and/or of the electronic device.

Instead of the socket or outlet, the bed 100 could be provided with an integral electrical cable, i.e. a cable projecting from the frame members and/or and permanently or semi-permanently attached thereto, and with a reel or support for rolling or storing the cable when no patient is on the bed and/or when the bed is in storage or alternatively a cable running in connecting arms for providing power outlet therein.

Also, while the electrical outlet of the bed 100 is located on one or both longitudinal frame members, it will be appreciated that the electrical outlet could be located elsewhere on the bed 100, for instance directly on the siderails 126, 128, 130 or 132, headboard 122 or footboard 124 (e.g. when they are not removable), frame supporting headboard 122 or footboard 124 (e.g. when they are configured to be removable) or anywhere else suitable on the bed 100, and that where multiple power outlets are used, they could be found in multiple locations (for instance on the headboard 122 or on the footboard 124, and on the longitudinal frame members)

The frame 200 further comprises a plurality of foot siderail mounting members for mounting the siderail assemblies to the bed 100. Alternatively, the foot siderail assemblies 130, 132 could instead be mounted directly to the longitudinal frame members, to the underside of the patient support surface 250 or to any other mounting structure provided on the bed 100.

The head siderail assemblies 126, 128 are directly mounted to the patient support surface 250. More specifically, the patient support surface 250 comprises a backrest 252, two core support panels 254, 256 and a lower body support panel 258, and the head siderail assemblies 126, 128 are mounted to the underside of the backrest 252. In the illustrated embodiment, the backrest 252 is adapted to be pivoted relative to the core support panels 254, 256 and the lower body support panel 258. The head siderail assemblies 126, 128 will therefore move along with the backrest 252 when the backrest 252 is pivoted.

As known in the art, in one example, the bed may comprise a patient platform comprising a backrest for supporting a patient's head and a patient's back region, a core body panel for supporting at least partially a patient's hip region and patient's legs, and a lower body panel for supporting the patient's legs. The bed also comprises a frame wherein the patient platform is mounted to the frame. Moreover, the bed comprises a base frame wherein the frame is mounted to the base frame. The bed further comprises a backrest actuator for pivoting the backrest relative to the frame, wherein the backrest actuator comprises a first actuator portion connected to an actuator pivot pin movably mounted to the frame and a second actuator portion connected to the backrest for pivoting the backrest relative to the frame. The bed also comprises a release that is movable between a locked position in which the first actuator portion is coupled to the second actuator portion and an unlocked position in which the second actuator portion is decoupled from the first actuator portion to allow free pivoting of the backrest towards the frame. The bed further comprises a resilient member between the frame and the actuator pivot pin to allow dampening pivoting movement of the backrest towards the frame when the release is moved from the unlocked position into the locked position.

As known in the art, in another example, the bed may comprise: a patient support assembly comprising a patient surface for supporting the patient and a frame comprising left and right longitudinal members, the patient surface being mounted to the frame. The bed also comprises a siderail disposed in a siderail plane, the siderail comprising an outer wall and an inner wall, a mounting member mounted to one of the left and right longitudinal members, and a connecting arm between the siderail and the mounting member. The connecting arm comprises an upper end pivotably connected to the inner wall of the siderail and a lower end pivotably connected to the mounting member, the upper end comprising an upper projection extending along an upper pivot axis and the lower end comprising a lower projection extending along a lower pivot axis. In use, the connecting arm pivots relative to the siderail about the upper pivot axis and relative to the mounting member about the lower pivot axis to allow the siderail to pivot along an arcuate path relative to the mounting member when pivoting between lowered and raised positions. Moreover, the lower and upper pivot axes are parallel to each other and angled downwardly relative to a horizontal plane such that, in use, the connecting arm is disposed in an arm plane that is angled outwardly from the patient support assembly when the siderail is in the raised position.

In a further example, the connecting arm is a first connecting arm and the siderail assembly comprises a second connecting arm that comprises a second upper end pivotably connected to the inner wall of the siderail and a second lower end pivotably connected to the mounting member, the second upper end comprising a second upper projection extending along a second upper pivot axis and the second lower end comprising a second lower projection extending along a second lower pivot axis. In use, the first and second connecting arms pivot relative to the siderail about the respective first and second upper pivot axes and relative to the mounting member about the respective first and second lower pivot axis to allow the siderail to pivot along the arcuate path relative to the mounting member when pivoting between the lowered and raised positions. Moreover, the second upper and lower pivot axes are parallel to each other and angled downwardly relative to the horizontal plane such that, in use, the second connecting arm is disposed in a second arm plane that is angled outwardly from the patient support assembly when the siderail is in the raised position. The first and second connecting arms are parallel to each other. The siderail plane may be a vertical plane. In the raised position, the siderail is in a first siderail plane, and in the lowered position, the siderail is in a second siderail plane parallel to the first siderail plane and spaced therefrom. The inner wall of the siderail may comprise a top portion that is generally planar and generally parallel to the siderail plane and a bottom portion that is angled towards the patient support assembly.

In one example of a prior bed, the siderail assembly comprises a siderail, a motion control assembly configured to be secured to the patient support assembly and footward and headward parallel connecting arms pivotably connecting the siderail to the motion control assembly to allow the siderail to be rotated relative to the patient support assembly between the lowered and raised positions. Each connecting arm comprises a top end pivotably connected to the siderail and a bottom end pivotably connected to the motion control assembly. Each connecting arm is generally elongated and flat and extends generally in an arm plane. The arm plane may be angled relative to the siderail plane by an angle of 5°. The siderail is movable inwardly towards the patient support assembly as the siderail is pivoted from the raised position towards the lowered position, and to be moved outwardly away from the patient support assembly as the siderail is pivoted from the lowered position towards the raised position. Such a motion control assembly is described in greater details in U.S. Pat. No. 10,058,468 issued to Umano Medical Inc. on Aug. 28, 2018.

As know in the art, in a further example, a bed for a patient may comprise: a patient platform comprising a backrest for supporting a patient's head and a patient's back region, a core body panel comprising first and second panels, the first panel for supporting at least partially a patient's hip region and the second panel for supporting at least partially the patient's hip region and patient's legs, the second panel comprising upper and lower ends, and a lower body panel for supporting the patient's legs, the lower body panel comprising upper and lower ends; a frame comprising a first longitudinal member, a second longitudinal members and a lower body transverse member, the first and second longitudinal members comprising first and second head ends and first and second foot ends, the lower body transverse member being between the first and second longitudinal members below the lower body panel, the patient platform being mounted to the frame; a base frame comprising a head member and a foot member, the frame being mounted to the base frame; a head elevation assembly comprising a head actuator comprising an upper end connected to the frame and a lower end pivotably connected to the head member of the base frame; a foot elevation assembly comprising a first actuator comprising an upper end connected to the frame and a lower end pivotably connected to the foot member of the base frame; a backrest pivoting system comprising a backrest actuator having a first actuator portion connected to an actuator pivot pin movably mounted to the frame and a second actuator portion connected to the backrest for pivoting the backrest relative to the frame; and a leg pivoting system for moving the second panel and the lower body panel relative to each other, wherein the lower end of the second panel is pivotably connected to the upper end of the lower body panel at a hinge connection, wherein the leg pivoting system comprises a second actuator comprising a lower end pivotably mounted to the lower body transverse member of the frame and an upper end pivotably connected to the hinge connection.

In use, upon actuation of the backrest actuator, the backrest may pivot forwardly at an angle up to about 60° relative to the frame such that the patient's head is above the patient's legs.

In use, upon actuation of the head actuator, the frame pivots may pivot forwardly at an angle up to about 15° relative to the base frame such that the patient's head is above the patient's legs.

In use, upon actuation of the first actuator of the foot assembly or upon actuation of a foot actuator, the frame may pivot rearwardly at an angle up to about 15° relative to the base frame such that the patient's head is below the patient's legs.

It would be desirable to be provided with a siderail configuration for a patient support apparatus that alleviates at least some of the above-identified drawbacks.

SUMMARY

According to a broad aspect, there is provided a barrier panel for a hospital bed including a patient support surface. In this broad aspect, the barrier panel comprises an inner face proximal to the patient support surface, an outer face distal from the patient support surface and a hollow space defined in the inner face, the hollow space being recessed relative to the inner face and extending toward the outer face.

In one feature, the barrier panel comprises a siderail.

In another feature, the hospital bed comprises a foot end, a head end and the patient support surface extends between the foot end and the head end. In this feature, the siderail comprises a footward end oriented toward the foot end of the bed and a headward end oriented toward the head end of the bed.

In still another feature, the hollow space is located in a first intermediate location between the footward end and the headward end.

In yet another feature, the intermediate location is located closer to the footward end than from the headward end.

In a further feature, the siderail further comprises a top edge and a bottom edge.

In yet a further feature, the hollow space extends from the top edge to a second intermediate location between the top edge and the bottom edge.

In an additional feature, the hollow space is defined by a bottom face extending between the footward end and the headward end at the second intermediate location, at least one side face extending between the bottom face and the top edge of the siderail and a back face extending along a siderail plane P.

In still an additional feature, the at least one side face extending between the bottom face and the top edge of the siderail comprises a footward side face and a spaced-apart headward side face, the footward side face and the headward side face extending parallel to one another and perpendicular to the bottom face.

In another feature, the bottom face extends at an angle relative to the bottom edge of the siderail. In one feature, the angle relative to the bottom edge of the siderail varies between 5 and 20°. In another feature, the angle relative to the bottom edge of the siderail is one of a 7° angle or a 15° angle.

In still another feature, the siderail further comprises at least one projection extending from the inner surface and partially covering the hollow space.

In yet another feature, the at least one projection comprises a lower projection having a lower end attached to the inner face proximal to a junction between the bottom face of the hollow space and the inner face, and an upper end, the lower projection extending upwardly from the junction between the bottom face of the hollow space and the inner face to partially cover a lower portion of the hollow space.

In a further feature, the at least one projection comprises a first side projection having a first end attached to the inner face proximal to a junction between the inner face and one of the footward side face and the headward side face, and a second end, the first side projection extending along a longitudinal direction of the siderail from the junction between the inner face and the one of the footward side face and the headward side face to partially cover a portion of the hollow space.

In still a further feature, the at least one projection further comprises a second side projection having a first end attached to the inner face proximal to a junction between the inner face and the other of the footward side face and the headward side face, and a second end, the second side projection extending along the longitudinal direction of the siderail from the junction between the inner face and the other of the footward side face and the headward side face to partially cover a portion of the hollow space.

In another feature, the siderail further comprises at least one opening extending between the outer face and the inner face.

In still another feature, the at least one opening is located proximal to the top edge of the siderail, the siderail comprising an inner peripheral wall surrounding the at least one opening.

In yet another feature, the inner peripheral wall collaborates with the top edge of the siderail to define a grasping portion for manipulating at least one of the siderail and the hospital bed.

In a further feature, the top edge of the siderail at the grasping portion is beveled-shaped.

In an additional feature, the siderail further comprises a light mounted to the inner peripheral wall, the light being configured for illuminating the inner peripheral wall.

In yet an additional feature, the siderail further comprises a cable retaining device mounted to the inner peripheral wall and partially extending in the at least one opening.

In still an additional feature, the cable retaining device comprises a plate extending along the plane of the siderail and a V-shaped cut-out defined in the plate, the V-shaped cut-out being configured to receive therein a core portion of a cable.

In another feature, the siderail is one of a head siderail and a foot siderail.

In a further feature, the hollow space is configured to receive a handheld electronic device.

According to another broad aspect, there is provided a bed for a patient, the bed extending longitudinally along a longitudinal axis between a head or rear end and a foot or front end and extending transversely along a transversal axis between a left side and right side, the bed comprising: a patient support assembly comprising a patient surface for supporting the patient; a frame, the patient support assembly being mounted to the frame; a base frame comprising a head member and a foot member, the frame being mounted to the base frame; and a siderail comprising a bottom edge, a top edge, a rear edge, a front edge, and a panel extending longitudinally between the rear and front edges and extending upwardly from the bottom edge to the top edge, the panel comprising an inner wall facing the patient surface, an outer wall opposite the inner wall, a bottom wall extending along the inner wall and inwardly towards the patient surface, the bottom wall comprising a top surface and an inner surface facing the patient surface, and an inner projection extending upwardly from a portion of the bottom wall, the inner projection comprising a top edge, an outer surface facing the patient surface, and an inner surface facing a portion of the inner wall, wherein a hollow space to receive an electronic device is defined by the top surface of the bottom wall, the inner surface of the inner projection and the portion of the inner wall.

According to a further broad aspect, there is provided a bed for a patient, the bed extending longitudinally along a longitudinal axis between a head or rear end and a foot or front end and extending transversely along a transversal axis between a left side and right side, the bed comprising: a patient support assembly comprising a patient surface for supporting the patient; a frame, the patient support assembly being mounted to the frame; and a siderail assembly comprising a siderail comprising an inner wall facing the patient surface, an outer wall opposite the inner wall, a bottom edge, and a top edge, a mounting member mounted to the patient support assembly or the frame, and a connecting arm between the siderail and the mounting member; wherein the siderail comprises a bottom wall extending along the inner wall and inwardly towards the patient surface, the bottom wall comprising a top surface and an inner surface facing the patient surface, and an inner projection extending upwardly from a portion of the bottom wall, the inner projection comprising a top edge, an outer surface facing the patient surface, and an inner surface facing a portion of the inner wall, wherein a hollow space to receive an electronic device is defined therebetween the top surface of the bottom wall, the inner surface of the inner projection and the portion of the inner wall.

According to another broad aspect, there is provided a siderail for a bed for a patient, the bed extending longitudinally along a longitudinal axis between a head or rear end and a foot or front end and extending transversely along a transversal axis between a left side and right side, the bed comprising a patient support assembly comprising a patient surface for supporting the patient, and a frame, the patient support assembly being mounted to the frame, the siderail comprising an inner wall for facing the patient surface, an outer wall opposite the inner wall, a bottom edge, and a top edge, wherein the siderail comprises an inner projection extending upwardly and being spaced from the inner wall of the siderail, the inner projection comprising a top edge, an outer surface for facing the patient surface, and an inner surface facing a portion the inner wall, wherein a hollow space to receive an electronic device is defined between the inner surface of the inner projection and the portion of the inner wall.

According to further broad aspect, there is provided a bed for a patient, the bed extending longitudinally along a longitudinal axis between a head or rear end and a foot or front end and extending transversely along a transversal axis between a left side and right side, the bed comprising a patient support assembly comprising a patient surface for supporting the patient, a frame, the patient support assembly being mounted to the frame, and a siderail comprising: a bottom edge; a top edge; a rear edge; a front edge; a panel extending longitudinally between the rear and front edges of the siderail and extending upwardly from the bottom edge to the top edge of the siderail, the panel comprising an inner wall facing the patient surface and an outer wall opposite the inner wall; a middle wall extending upwardly from the top edge of the panel, the middle wall comprising a rear surface and a front surface; and a top rail comprising a rear rail portion extending upwardly and forwardly from the rear edge of the siderail, the rear rail portion comprising a bottom surface and a top surface, a middle rail portion over the middle wall, the middle rail portion comprising a top surface, and a front rail portion extending downwardly and forwardly up to the front edge of the siderail, the front rail portion comprising a bottom surface and a top surface, the top surfaces of the rear, middle and front rail portions defining grasping portions for the patient or a user; wherein a front opening is defined therebetween a front portion of the top edge of the panel, the bottom surface of the front rail portion, and the front surface of the middle wall; and wherein the front surface of the middle wall comprises a light source oriented towards the front edge of the siderail and wherein upon actuation of a switch or control, the light source emits a light to illuminate the front portion of the top edge of the panel, the front opening, and the front rail portion.

According to another broad aspect, there is provided a siderail for a bed for a patient, the bed extending longitudinally along a longitudinal axis between a head or rear end and a foot or front end and extending transversely along a transversal axis between a left side and right side, the bed comprising a patient support assembly comprising a patient surface for supporting the patient, and a frame, the patient support assembly being mounted to the frame, the siderail comprising: a bottom edge; a top edge; a rear edge; a front edge; a panel extending longitudinally between the rear and front edges of the siderail and extending upwardly from the bottom edge to the top edge of the siderail, the panel comprising an inner wall for facing the patient surface and an outer wall opposite the inner wall; a middle wall extending upwardly from the top edge of the panel, the middle wall comprising a rear surface and a front surface; and a top rail comprising a rear rail portion extending upwardly and forwardly from the rear edge of the siderail, the rear rail portion comprising a bottom surface and a top surface, a middle rail portion over the middle wall, the middle rail portion comprising a top surface, and a front rail portion extending downwardly and forwardly up to the front edge of the siderail, the front rail portion comprising a bottom surface and a top surface, the top surfaces of the rear, middle and front rail portions defining grasping portions for the patient or a user; wherein a rear opening is defined therebetween a rear portion of the top edge of the panel, the bottom surface of the rear rail portion, and the rear surface of the middle wall or wherein a front opening is defined therebetween a front portion of the top edge of the panel, the bottom surface of the front rail portion, and the front surface of the middle wall; and wherein the front surface of the middle wall comprises a light source oriented towards the front edge of the siderail and wherein upon actuation of a switch or control, the light source emits a light to illuminate the front portion of the top edge of the panel, the front opening and the front rail portion or wherein the rear surface of the middle wall comprises a light source oriented towards the rear edge of the siderail and wherein upon actuation of a switch or control, the light source emits a light to illuminate the rear portion of the top edge of the panel, the rear opening and the rear rail portion.

According to a further broad aspect, there is provided a bed for a patient, the bed extending longitudinally along a longitudinal axis between a head or rear end and a foot or front end and extending transversely along a transversal axis between a left side and right side, the bed comprising a patient support assembly comprising a patient surface for supporting the patient, a backrest for supporting a patient's head and a patient's back region, a core body panel for supporting at least partially a patient's hip region and patient's legs, and a lower body panel for supporting the patient's legs, and a frame, the patient support assembly being mounted to the frame, the siderail comprising: a bottom edge; a top edge; a rear edge; a front edge; and a panel extending longitudinally between the rear and front edges of the siderail and extending upwardly from the bottom edge to the top edge of the siderail, the panel comprising an inner wall facing the patient surface and the backrest, an outer wall opposite the inner wall, wherein the panel comprises a rear portion adjacent the rear edge of the siderail, wherein the rear portion of the panel comprises a speaker for emitting sounds towards the patient's head.

These and other aspects of the invention will now become apparent to those of ordinary skill in the art upon review of the following description of embodiments of the invention in conjunction with the accompanying drawings.

BRIEF DESCRIPTION OF THE DRAWINGS

Having thus generally described the nature of the invention, reference will now be made to the accompanying drawings, showing by way of illustration example embodiments thereof and in which.

DETAILED DESCRIPTION OF EMBODIMENTS

Figure 1:
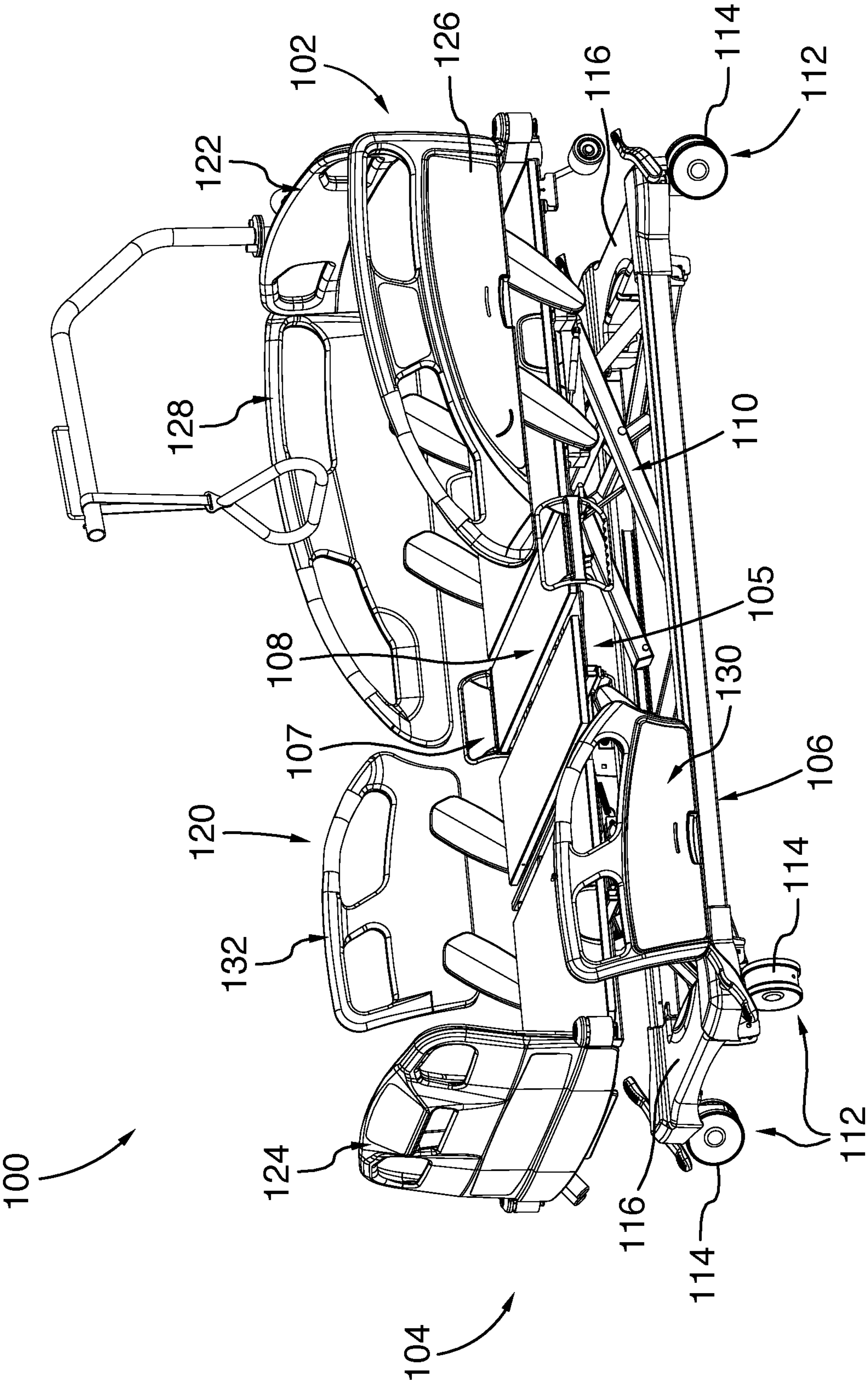
FIG. 1 is a perspective view of a bed known in the art, with a siderail assembly in a raised position.
Figure 2:
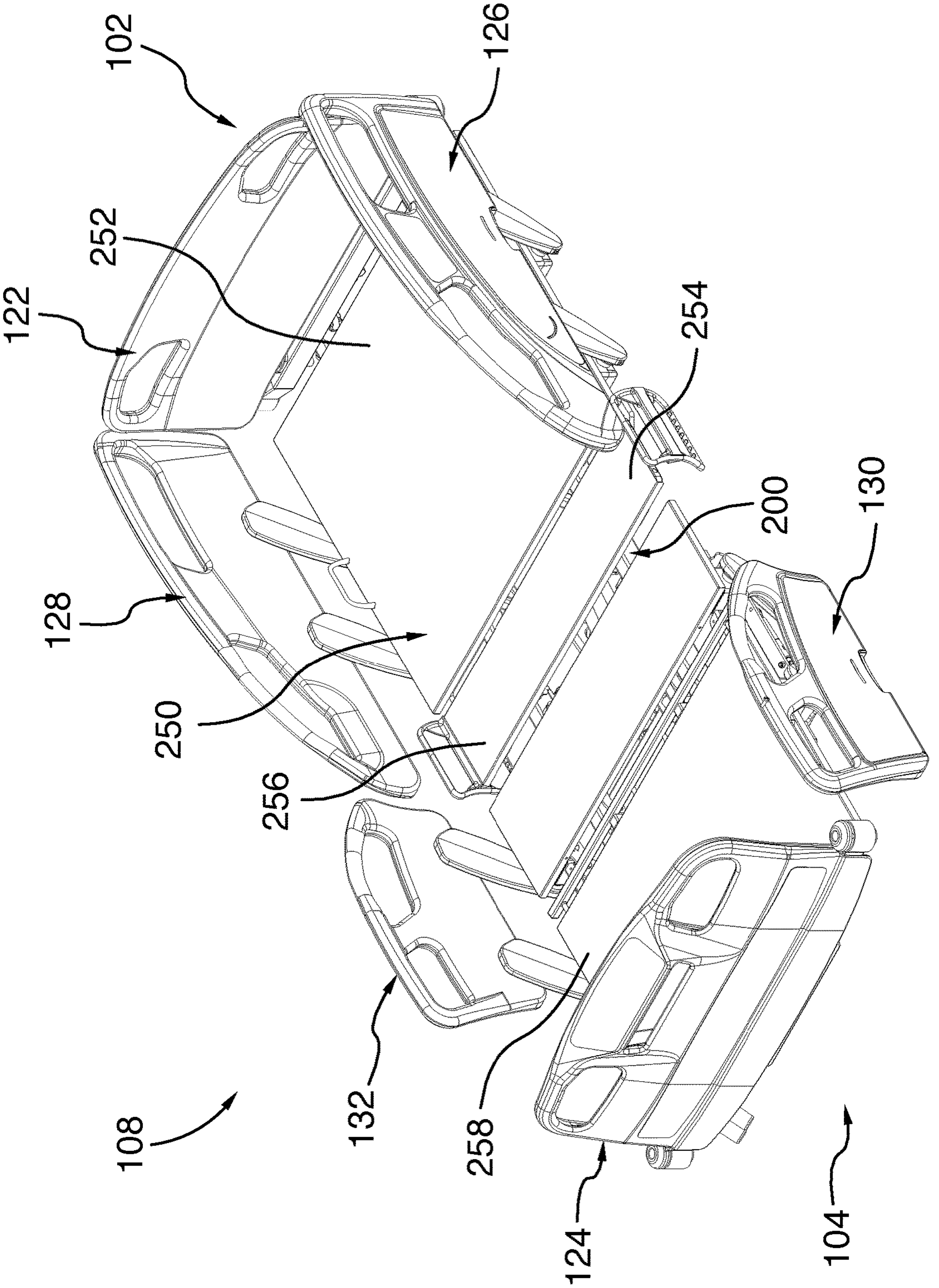
FIG. 2 is a perspective view of the patient support assembly of the bed of FIG. 1.
Figure 3:
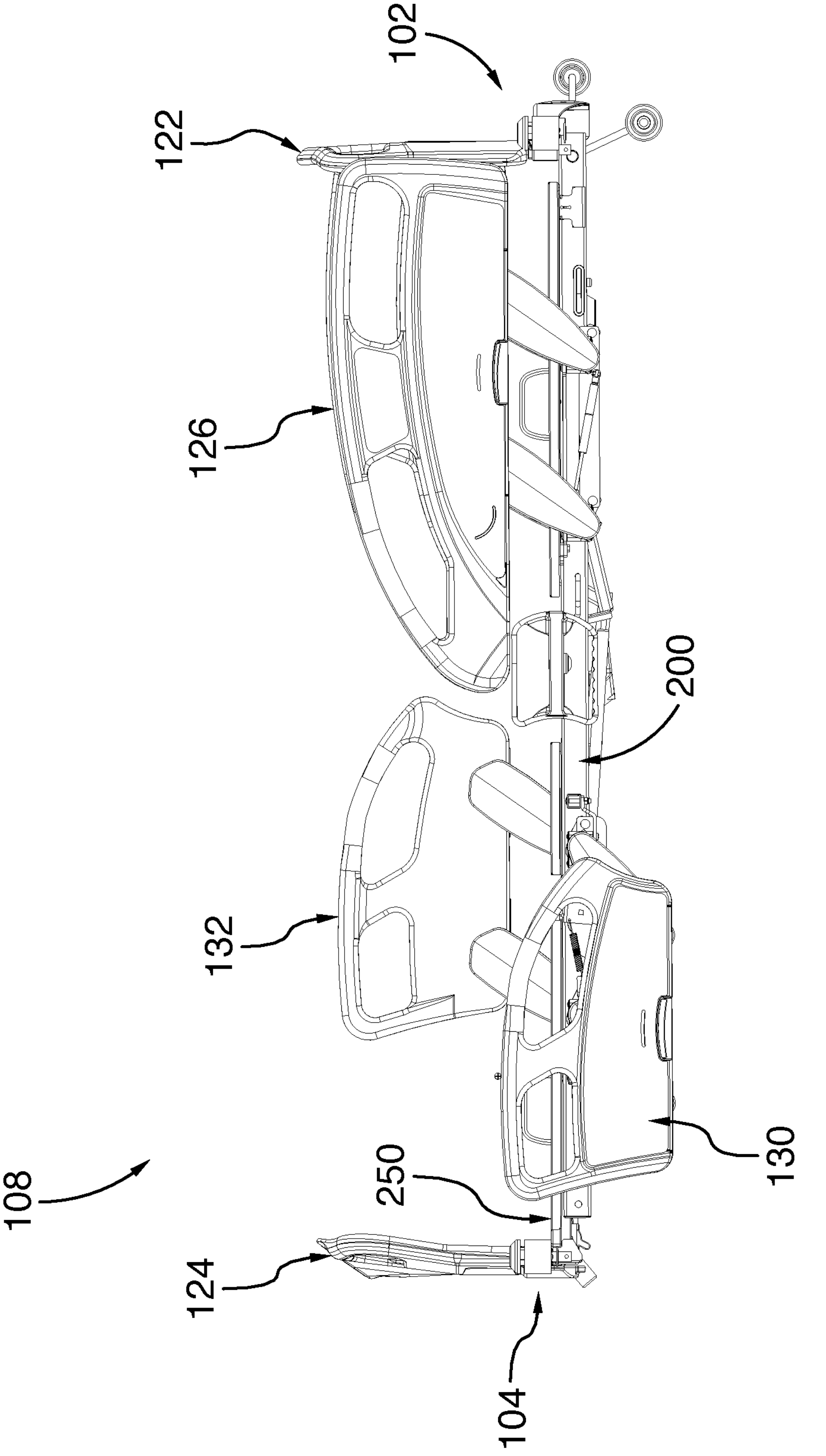
FIG. 3 is a side elevational view of the patient support assembly of FIG. 2.

In the following description, the same numerical references refer to similar elements. Furthermore, for the sake of simplicity and clarity, namely so as to not unduly burden the figures with several reference numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only.

Moreover, it will be appreciated that positional descriptions such as "above", "below", "forward", "rearward", "left", "right" and the like should, unless otherwise indicated, be taken in the context of the figures only and should not be considered limiting. The use of "including," "comprising," or "having" and variations thereof herein is meant to encompass the items listed thereafter and equivalents thereof as well as additional suitable items. Unless specified or limited otherwise, the terms "mounted," "connected," "supported," and "coupled" and variations thereof are used broadly and encompass both direct and indirect mountings, connections, supports, and couplings and are thus intended to include direct connections between two members without any other members interposed therebetween and indirect connections between members in which one or more other members are interposed therebetween. Further, "connected" and "coupled" are not restricted to physical or mechanical connections or couplings. Additionally, the words "lower", "upper", "upward", "down" and "downward" designate directions in the drawings to which reference is made.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

It is to be understood that the phraseology and terminology employed herein is not to be construed as limiting and are for descriptive purpose only. The principles and uses of the teachings of the present disclosure may be better understood with reference to the accompanying description, figures and examples. It is to be understood that the details set forth herein do not construe a limitation to an application of the disclosure.

Furthermore, it is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

Some of the structural components will be designated hereinafter as "rear", "front", "left" and "right", from the reference point of a person or patient being on a patient surface of the bed with the patient's head oriented toward the rear end of the bed and the patient's legs oriented toward the front end of the bed. Similarly, the term "headward" or "rearward" refers to an element located towards the head or rear end of the bed and the term "footward" or "forward" refers to an element located towards the foot or front end of the bed. Furthermore, an interior or an inner view shows an element as seen by the patient looking into the interior or inner parts of the bed and an exterior or an outer view shows an element as seen by a person looking into the exterior or outer parts of the bed. Generally, the exterior or outer view shows the exterior or outer surfaces of the bed and the interior or inner view shows the interior or inner surfaces of the bed.

Variants, examples, and preferred embodiments of the invention are described hereinbelow. FIGS. 4 to 8 show a left siderail 300 in accordance with one embodiment. The same description also applies to the right siderail, which is a mirror image of the left siderail. In an alternate embodiment, the right siderail could be configured differently than the left siderail.

It is understood that the siderail 300 is adapted to be in a siderail assembly of a bed for a patient. The bed extends longitudinally along a longitudinal axis between a head or rear end and a foot or front end and extending transversely along a transversal axis between a left side and right side. The bed comprises a patient support assembly comprising a patient surface for supporting the patient, a backrest for supporting a patient's head and a patient's back region, a core body panel for supporting at least partially a patient's hip region and patient's legs, and a lower body panel for supporting the patient's legs. The bed also comprises a frame, the patient support assembly being mounted to the frame, a base frame comprising a head member and a foot member, the frame being mounted to the base frame, and a backrest pivoting system comprising a backrest actuator for pivoting the backrest relative to the frame.

The siderail assembly may comprise first and second mounting members mounted to the patient support assembly or the frame and first and second connecting arms between the siderail and the first and second mounting members. The first and second connecting arms comprise first and second top end pivotably connected to the siderail and first and second bottom ends pivotably connected to the first and second mounting members, the first and second top ends comprising first and second top projections extending along first and second top pivot axes and the first and second bottom ends comprising first and second bottom projections extending along first and second bottom pivot axes. In use, the first and second connecting arms pivot relative to the siderail about the first and second top pivot axes and relative to the first and second mounting members about the first and second bottom pivot axes to allow the siderail to pivot along an arcuate path relative to the first and second mounting members when pivoting between a lowered position and a raised position. The first and second top and bottom pivot axes are parallel to each other and angled downwardly relative to a horizontal plane such that, in use, the first and second connecting arms are in an arm plane that is angled outwardly from the patient support assembly when the siderail is in the raised position.

The siderail 300 comprises a bottom edge 302, a top edge 304, a rear edge 306, a front edge 308, and a panel 310 extending longitudinally between the rear and front edges 306, 308 and extending upwardly from the bottom edge 302 to the top edge 304, the panel 310 comprising an inner wall 312 for facing the patient surface and an outer wall 314 opposite the inner wall 312.

The rear edge 306 may be adjacent to the head end of the bed, the front edge 308 of the siderail may be adjacent an intermediate portion of the bed, and the panel 310 be adjacent the backrest of the patient support assembly of the bed.

The panel 310 comprises a bottom wall 316 extending along the inner wall 312 and inwardly towards the patient surface, the bottom wall 316 comprising a top surface 318 and an inner surface 320 facing the patient surface. The siderail or panel also comprises an inner projection 322 extending upwardly and being spaced from the inner wall of the siderail or panel. The inner projection 322 comprises a top edge 324, an outer surface 326 facing the patient surface, and an inner surface 328 facing a portion 313 of the inner wall 312. In one variant, the inner projection 322 extends upwardly from a portion 321 of the bottom wall 316. A hollow space 330 to receive an electronic device 400 is defined by the top surface 318 of the bottom wall 316, the inner surface 328 of the inner projection 322 and the portion 313 of the inner wall 312. The hollow space 330 defines a storage compartment for receiving and maintaining the electronic device 400 (for instance, a smartphone, a tablet, a portable video game player, a handheld electronic device, a personal digital assistant (PDA), a mobile audio or video player, a camera, or a wearable computer or electronic device).

In one example, the inner projection 322 is integrally molded with the bottom wall. In another example, the inner projection 322 is secured to the bottom wall. For instance, the inner projection may be secured to the bottom wall with treaded fastener or rivets. Alternatively, the inner projection may be glued or plastic welded to the bottom wall.

The portion 313 of the inner wall 312 may be a flat portion of the inner wall 312. Alternatively, the portion 313 of the inner wall 312 may be a recessed portion defined by inner wall portions of the inner wall. The inner wall portions may extend inwardly towards the patient surface such that the portion 313 is a recessed portion with a depth between 0.5 mm and 5.0 mm. The inner wall portions defining the recessed portion may provide further abutment for the electronic device 400.

The siderail 300 or the panel 310 comprises a rear wall 332 extending upwardly along the inner wall 312 and inwardly towards the patient surface, the rear wall 332 comprising a front surface 334 and an inner surface 336 facing the patient surface. The rear wall 332 and the bottom wall 316 are joined together at a rear corner. In this variant, the hollow space 330 is defined therebetween the front surface 334 of the rear wall 332, the top surface 318 of the bottom wall 316, the inner surface 328 of the inner projection 322 and the portion 313 of the inner wall 312.

The siderail 300 or the panel 310 also comprises a front wall 338 extending upwardly along the inner wall 312 and inwardly towards the patient surface, the front wall 338 comprising a rear surface 340 and an inner surface 342 facing the patient surface. The front wall 338 and the bottom wall 316 are joined together at a front corner. In this variant, the hollow space 330 is defined therebetween the rear surface 340 of the front wall 338, the front surface 334 of the rear wall 332, the top surface 318 of the bottom wall 316, the inner surface 328 of the inner projection 322 and the portion 313 of the inner wall 312.

Rear, bottom, and front inner wall portions defining the recessed portion 313 may be flush with the front surface 334 of the rear wall 332, the top surface 318 of the bottom wall 316, and the rear surface 340 of the front wall 338. Rear, bottom, and front inner wall portions defining the recessed portion 313 and front, top, and rear surfaces 334, 318, 340 may define rear, bottom, and front flat abutting surfaces.

Figure 4:
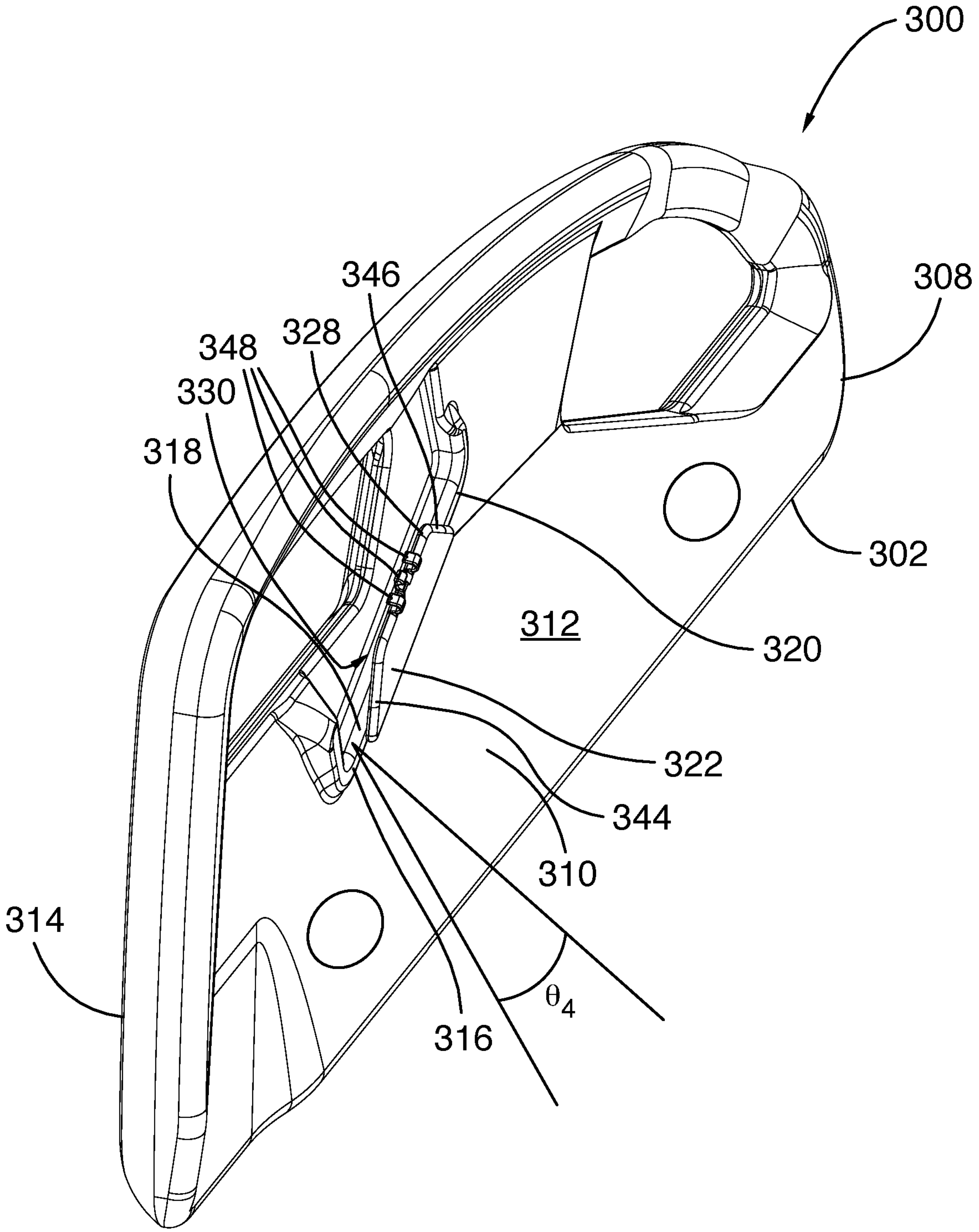
FIG. 4 is a first perspective view of a siderail in accordance with an embodiment.
Figure 5:
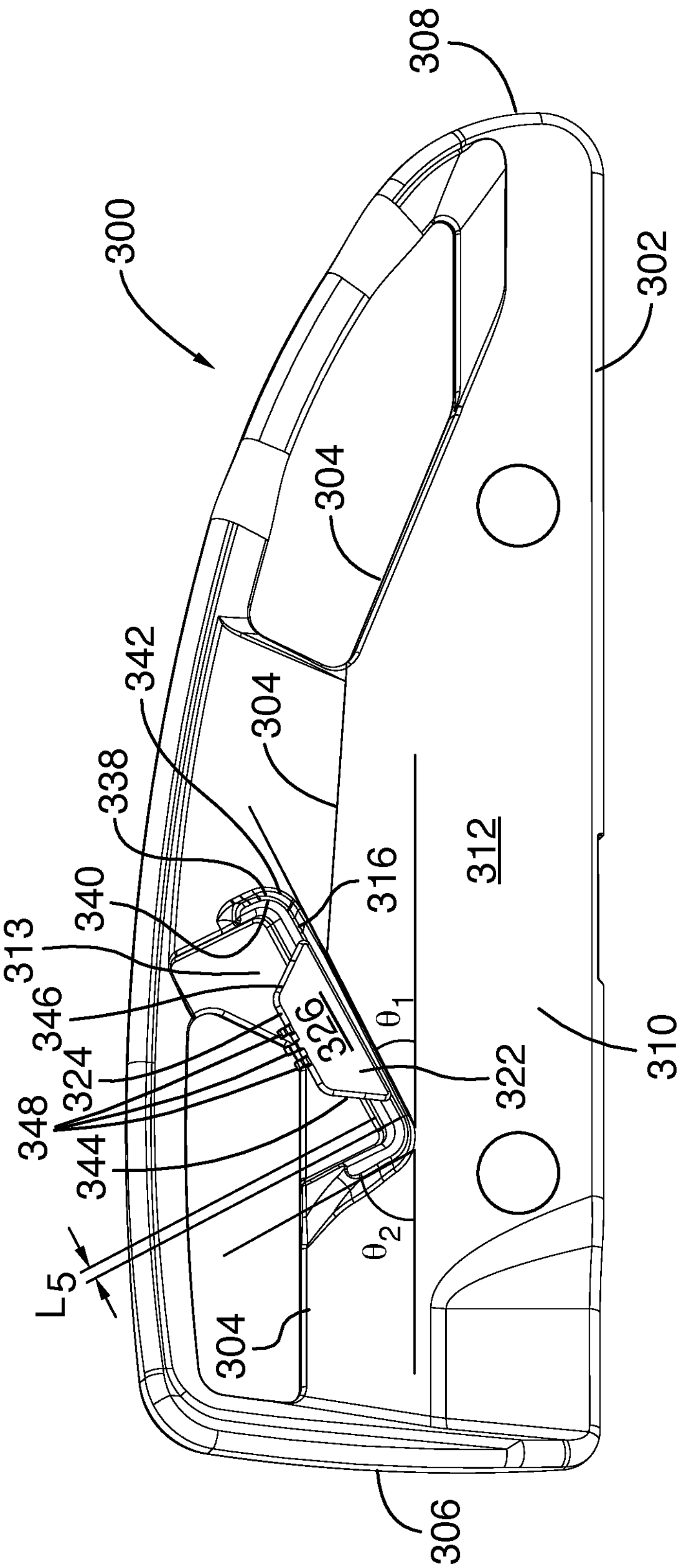
FIG. 5 is a side elevational view of the siderail of FIG. 4.
Figure 6:
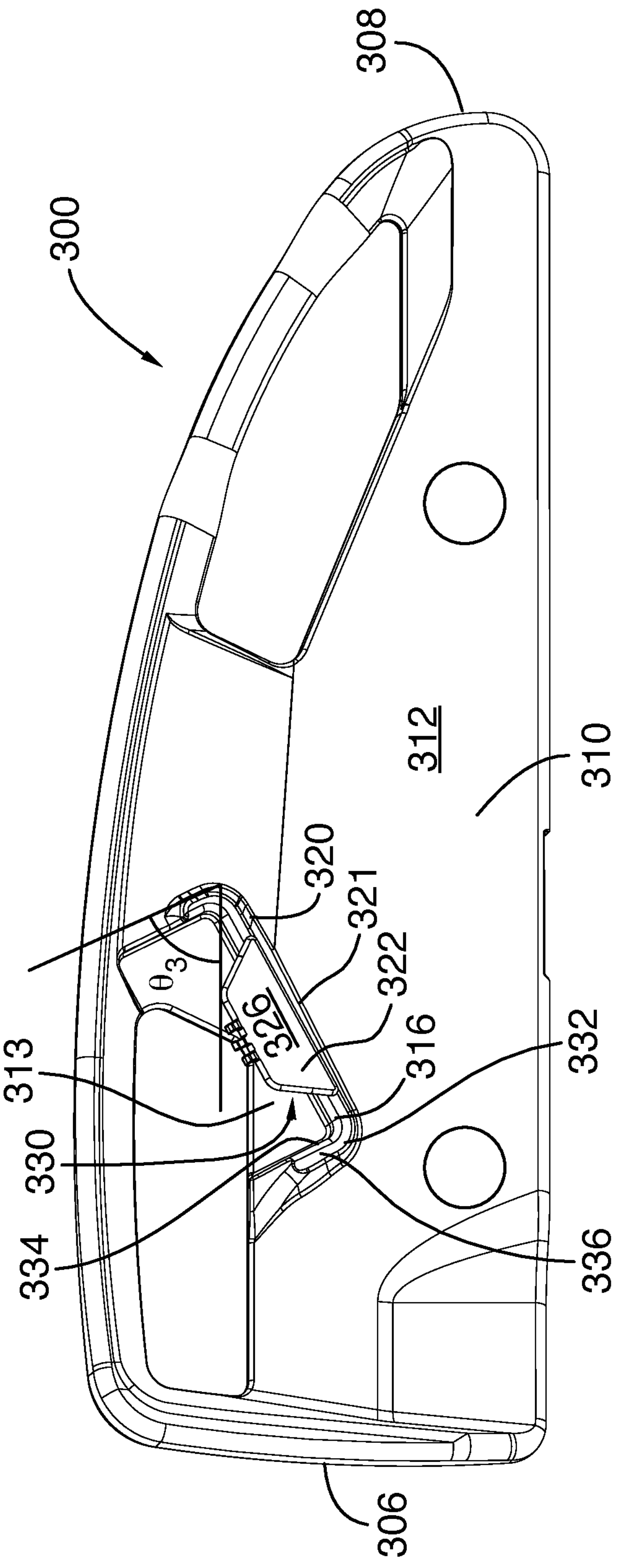
FIG. 6 is a second perspective view of the siderail of FIG. 4.

As shown in FIG. 5, the bottom wall 316 extends along the inner wall 312 towards the top edge 304 at an angle $\Theta_1$ between 20° and 40° or between 25° and 35° or about 30° relative to the longitudinal axis. The rear wall 332 extends upwardly at an angle $\Theta_2$ between 50° and 70° relative to the longitudinal axis. As shown in FIG. 6, the front wall 338 extends upwardly at an angle $\Theta_3$ between 50° and 70° relative to the longitudinal axis. Moreover, the bottom wall 316 extends inwardly and downwardly towards the patient surface at an angle $\Theta_4$ between 2° and 8° relative to the transversal axis, as shown in FIG. 4.

Figure 7:
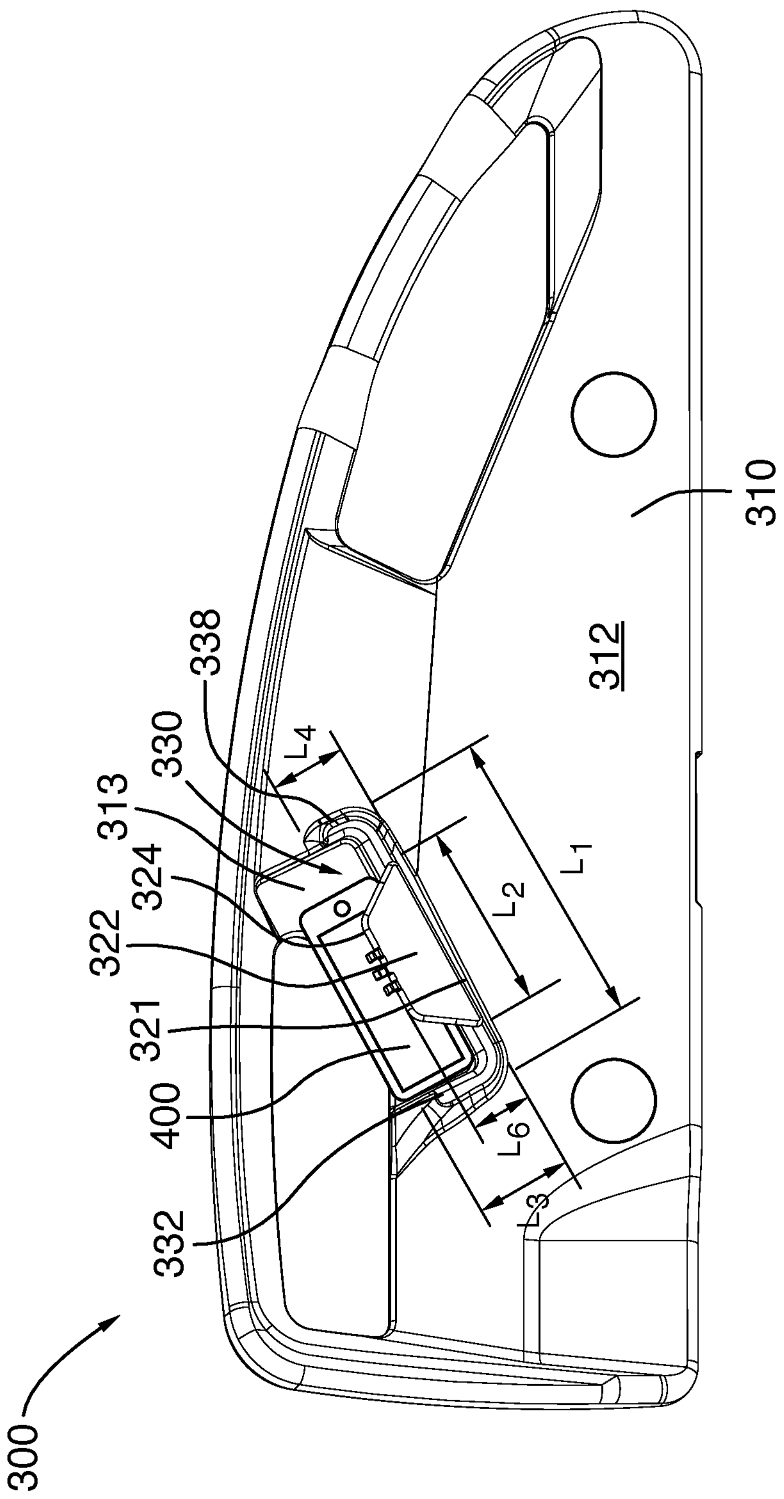
FIG. 7 is a side elevational view of the siderail of FIG. 4 with an electronic device received in a hollow space in a first position.

As shown in FIG. 7, the bottom wall 316 extends upwardly along the inner wall 312 over a distance $L_1$ between 175 mm and 200 mm, the portion 321 of the inner surface 320 from which the inner projection 322 extends has a length $L_2$ between 100 mm and 150 mm, the rear wall 332 extends upwardly along the inner wall 312 over a length $L_3$ between 70 mm and 125 mm, and the front wall 338 extends upwardly along the inner wall 312 over a length $L_4$ between 35 mm and 65 mm.

As shown in FIG. 5, the bottom wall 316 extends inwardly toward the patient surface over a length $L_5$ between 10 mm and 15 mm.

As shown in FIG. 7, the inner projection 322 extends upwardly up to the top edge 324 of the inner projection over a length Le between 30 mm and 50 mm.

The inner projection 322 also comprises a rear edge 344 and a front edge 346, wherein the rear edge 344, the top edge 324, and/or the front edge 346 comprises a hook 348 or a plurality of hooks 348 for at least partially retaining a cable of the electronic device 400.

Figure 8:
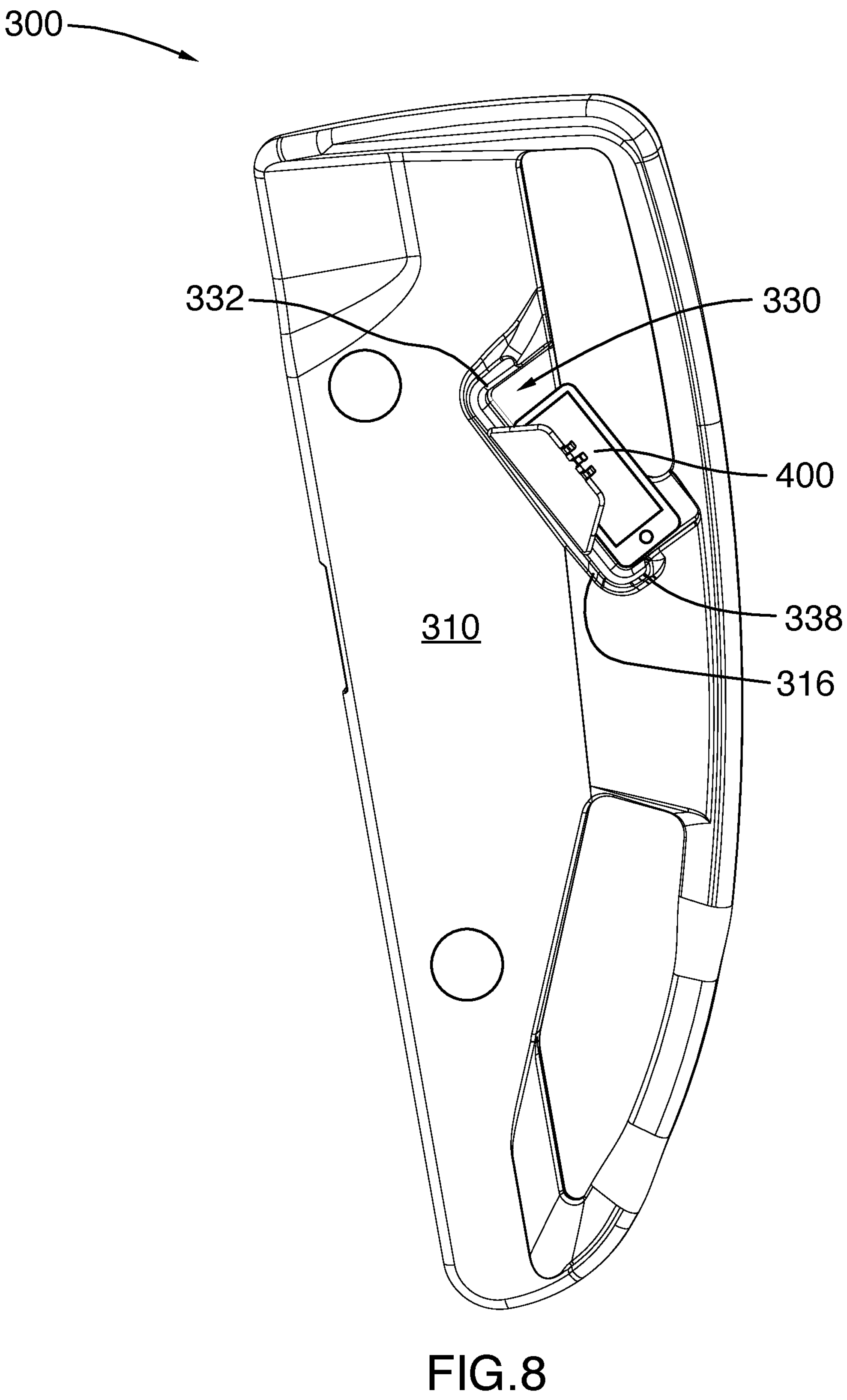
FIG. 8 is a side elevational view of the siderail of FIG. 7 in an inclined position with the electronic device received in the hollow space in a second position.
Figure 9:
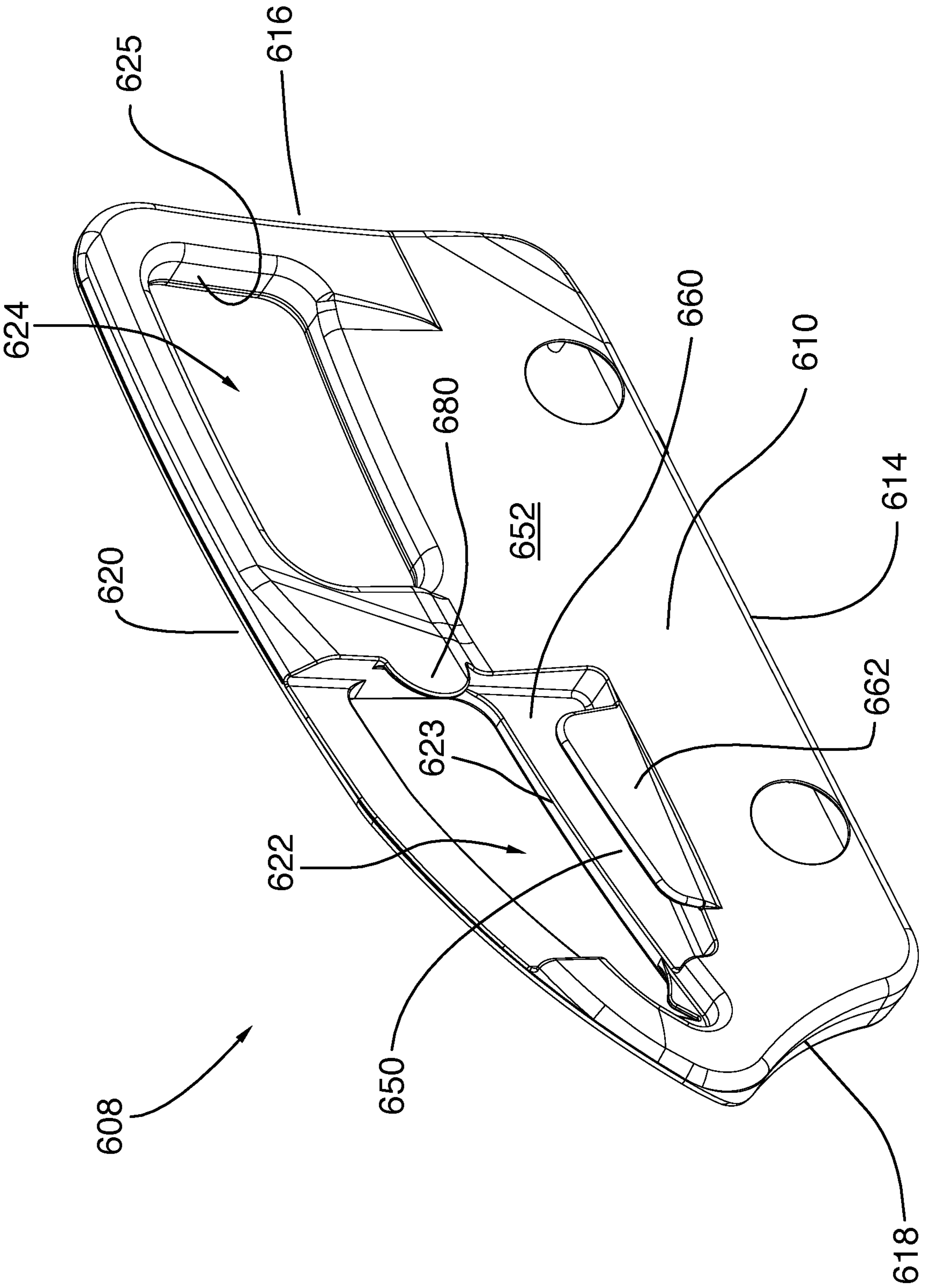
FIG. 9 is a first perspective view of a siderail in accordance with another embodiment.
Figure 10:
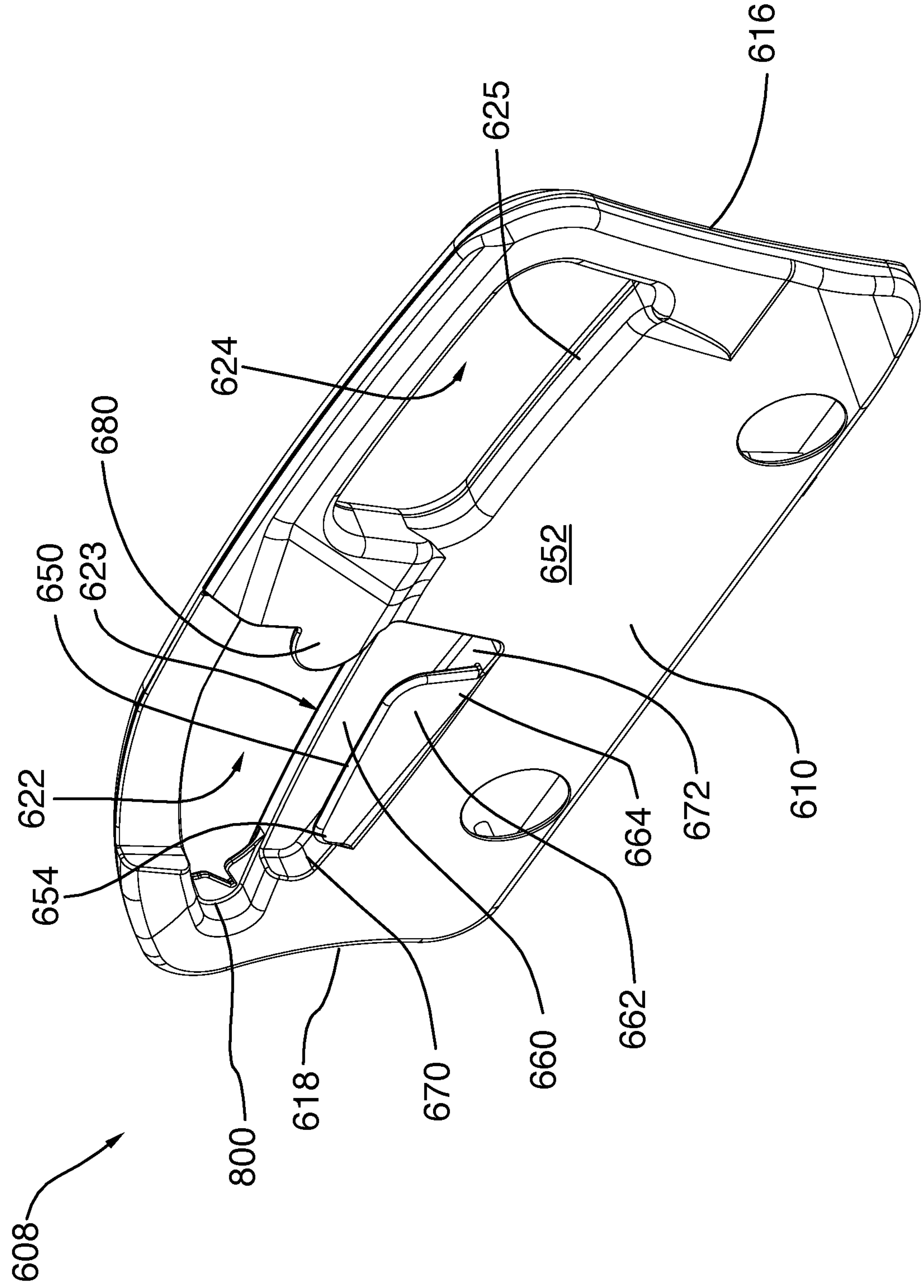
FIG. 10 is a second perspective view of the siderail of FIG. 9.
Figure 11:
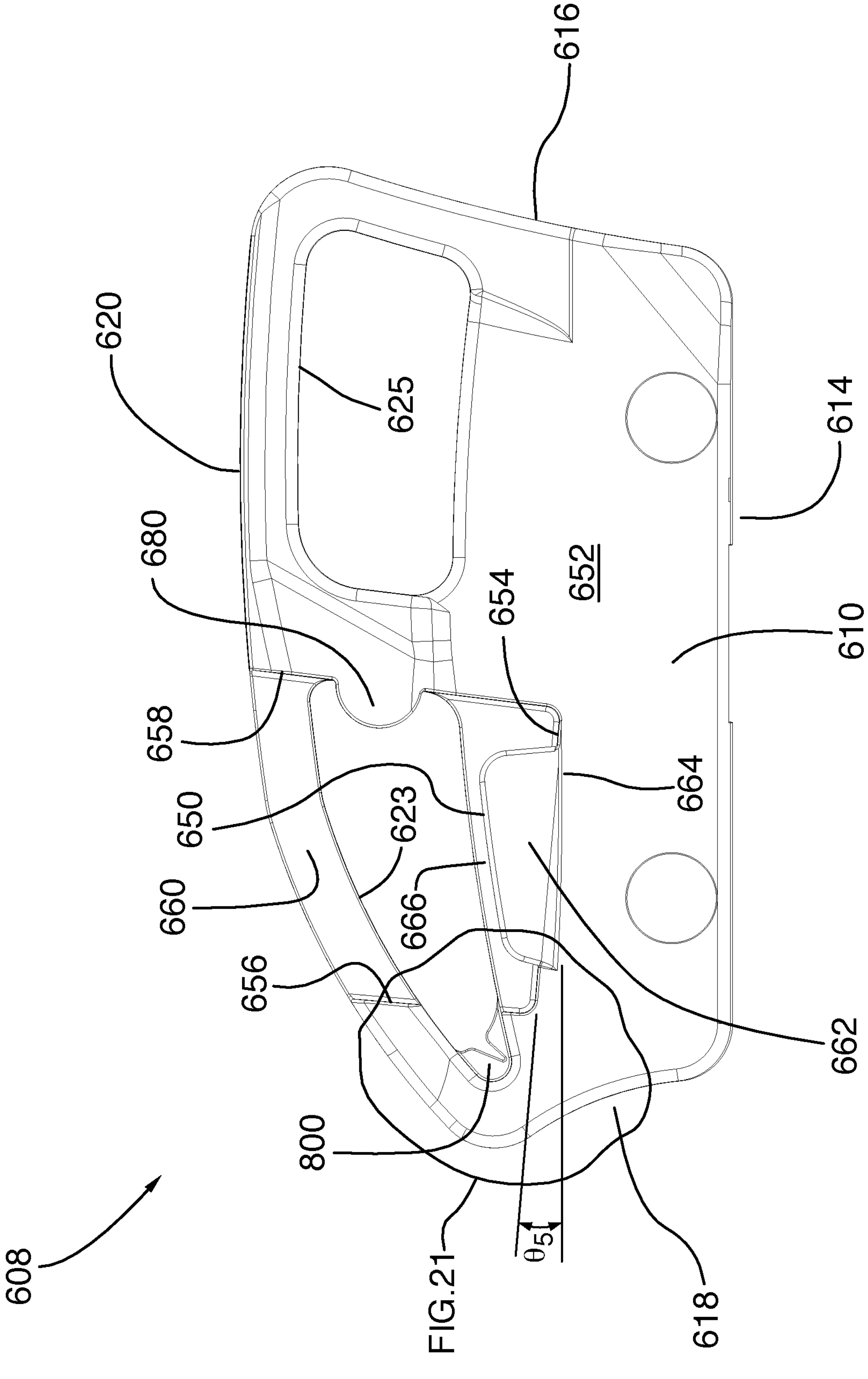
FIG. 11 is inner elevational side view of the siderail of FIG. 9.
Figure 12:
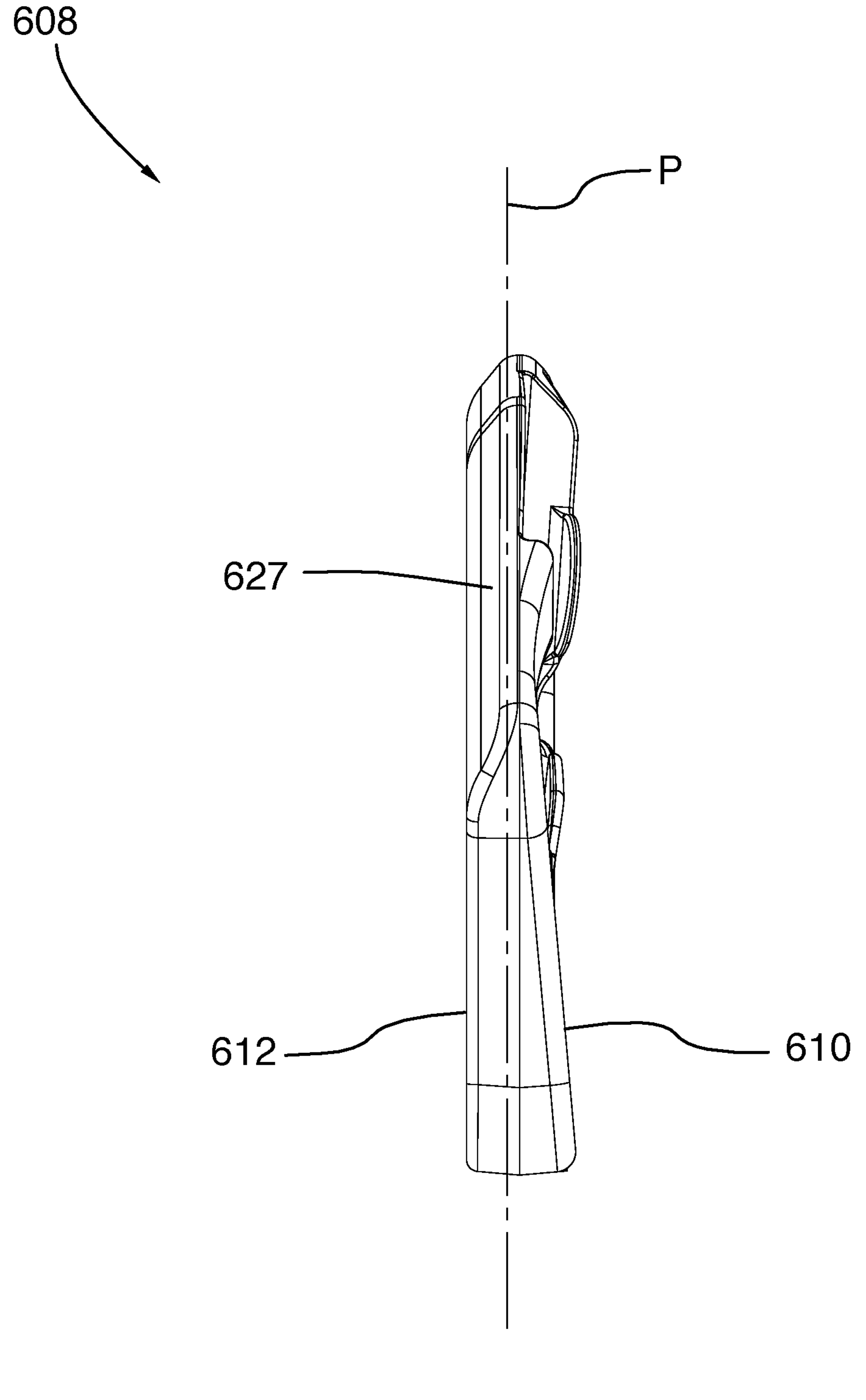
FIG. 12 is a rear or head view of the siderail of FIG. 9.
Figure 13:
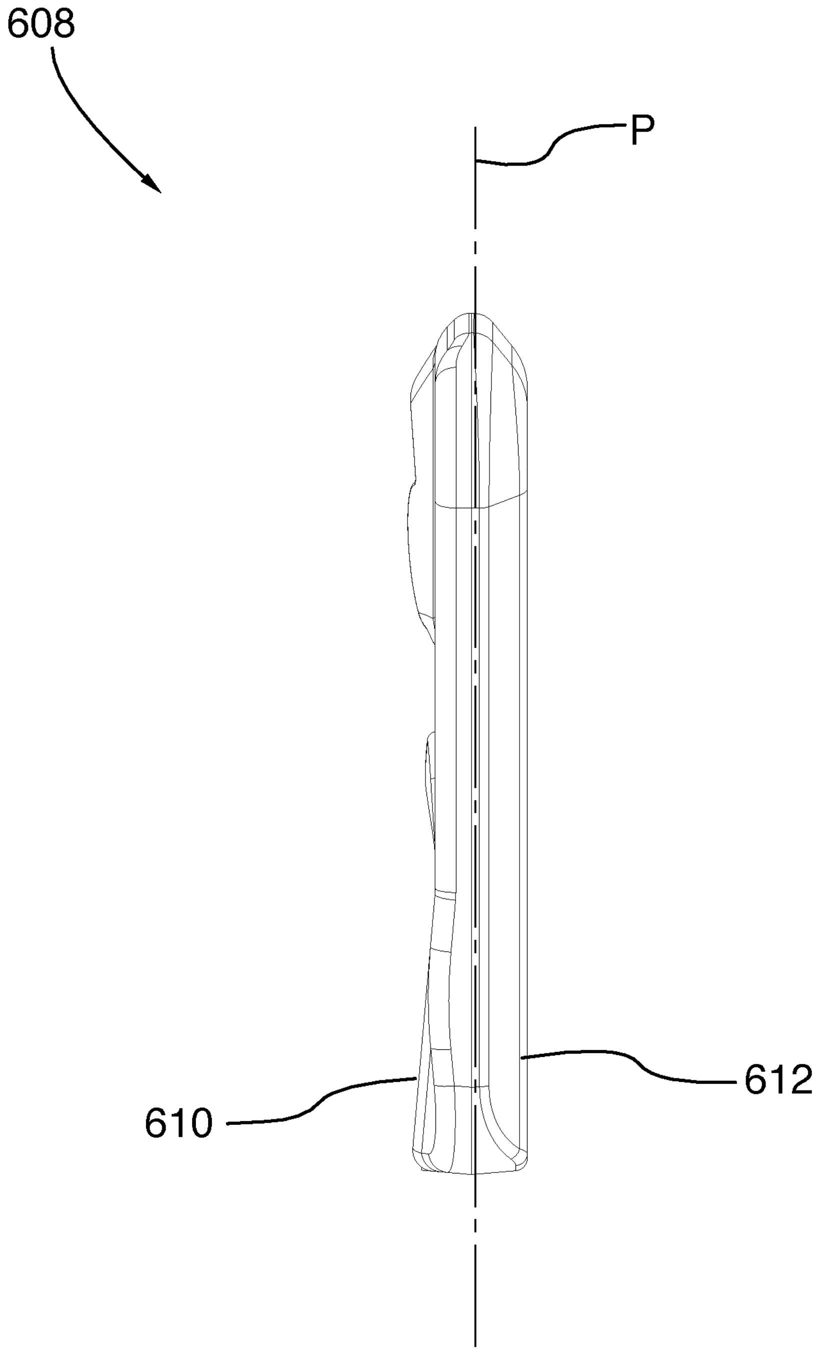
FIG. 13 is a front or foot view of the siderail of FIG. 9.
Figure 14:
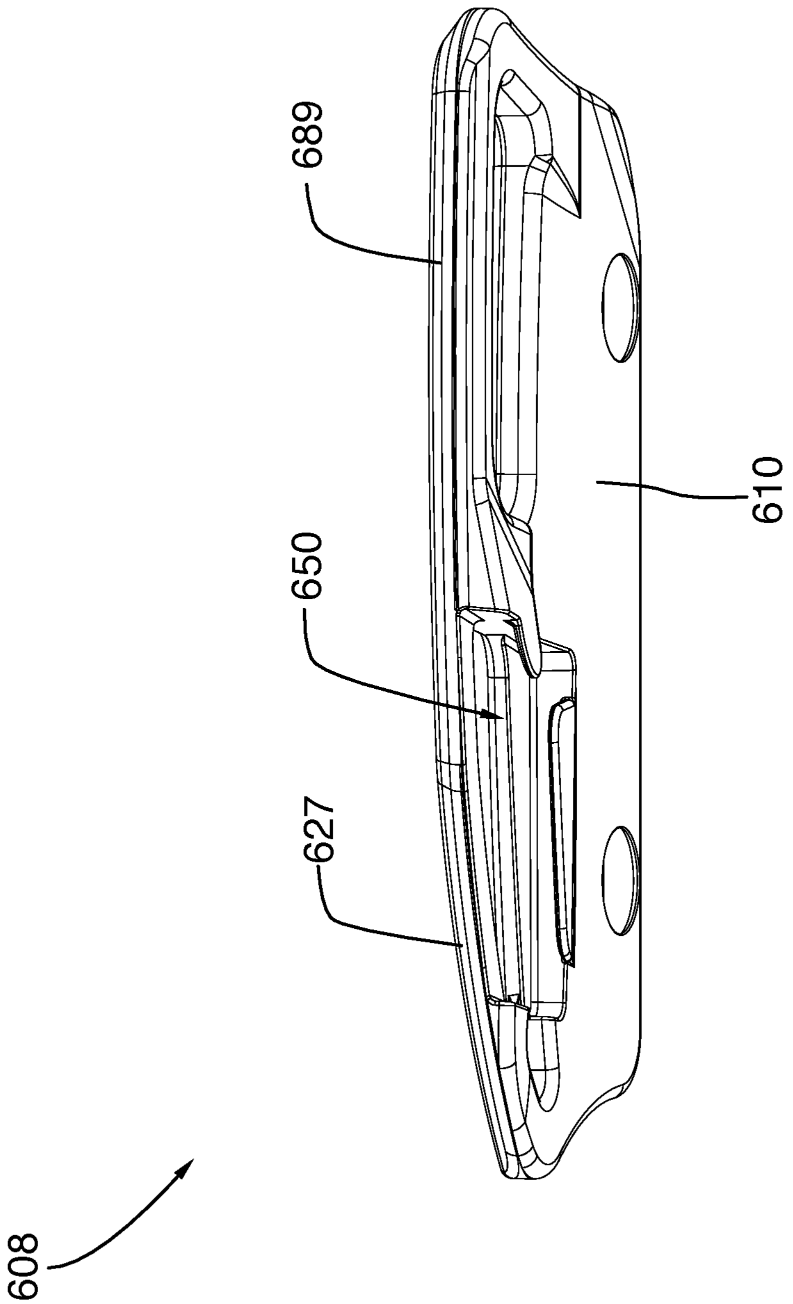
FIG. 14 is a top perspective view of the siderail of FIG. 9.
Figure 15:
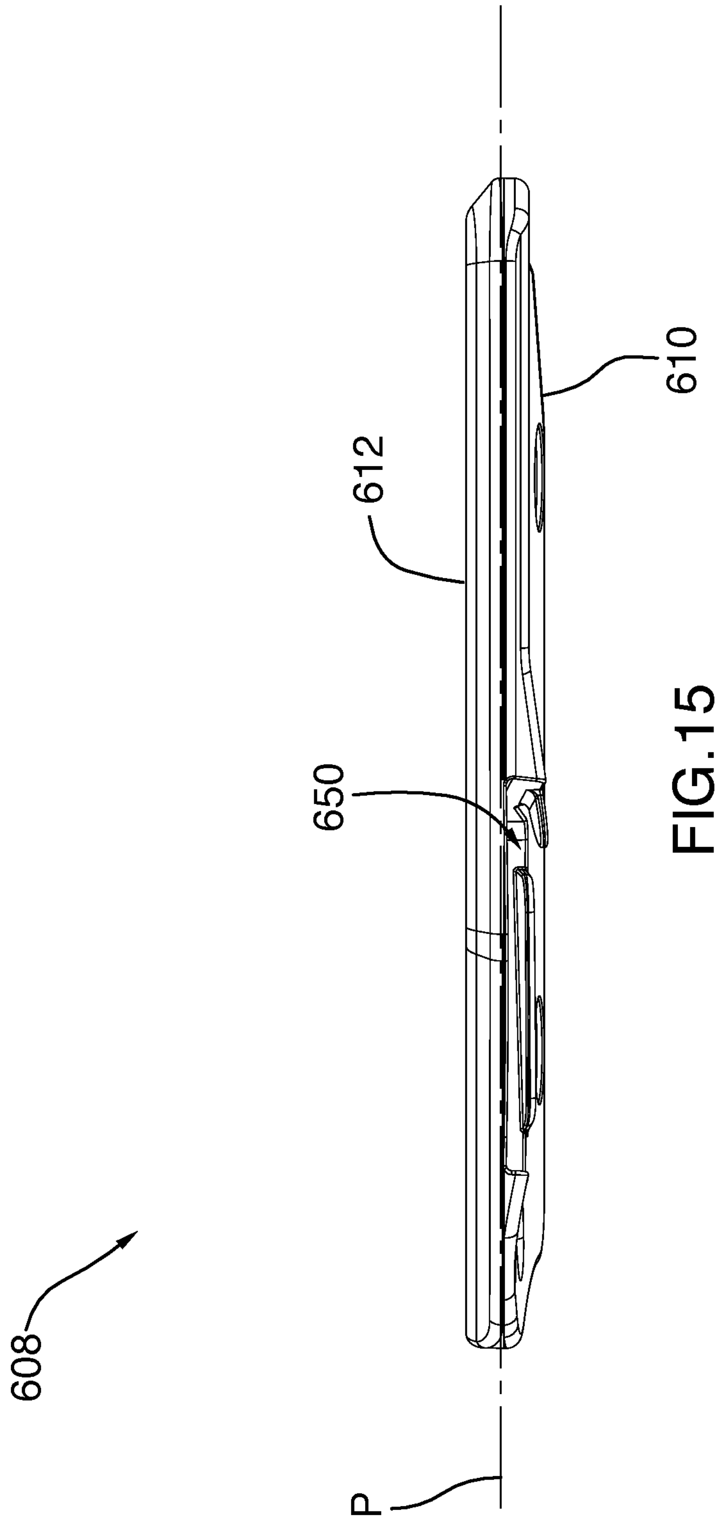
FIG. 15 is a top view of the siderail of FIG. 9.
Figure 16:
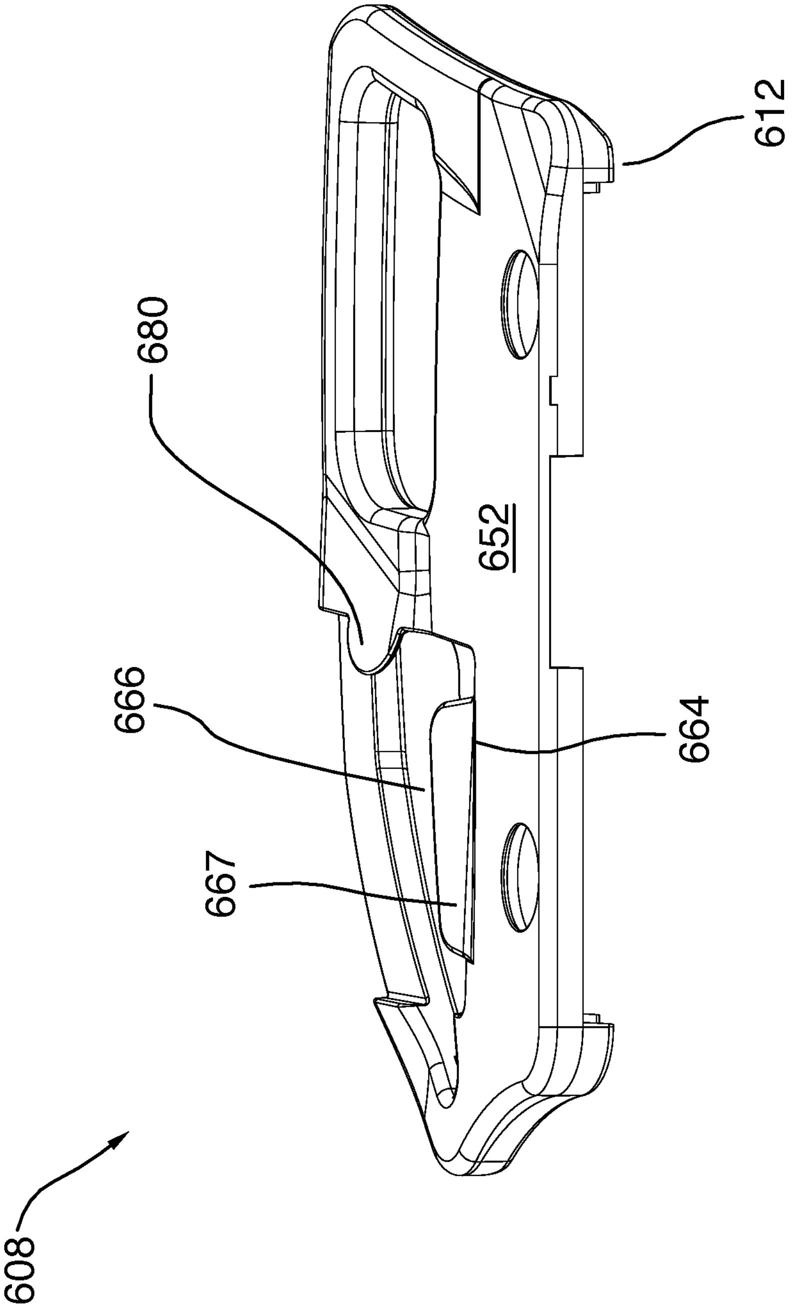
FIG. 16 is a bottom perspective view of the siderail of FIG. 9.
Figure 17:
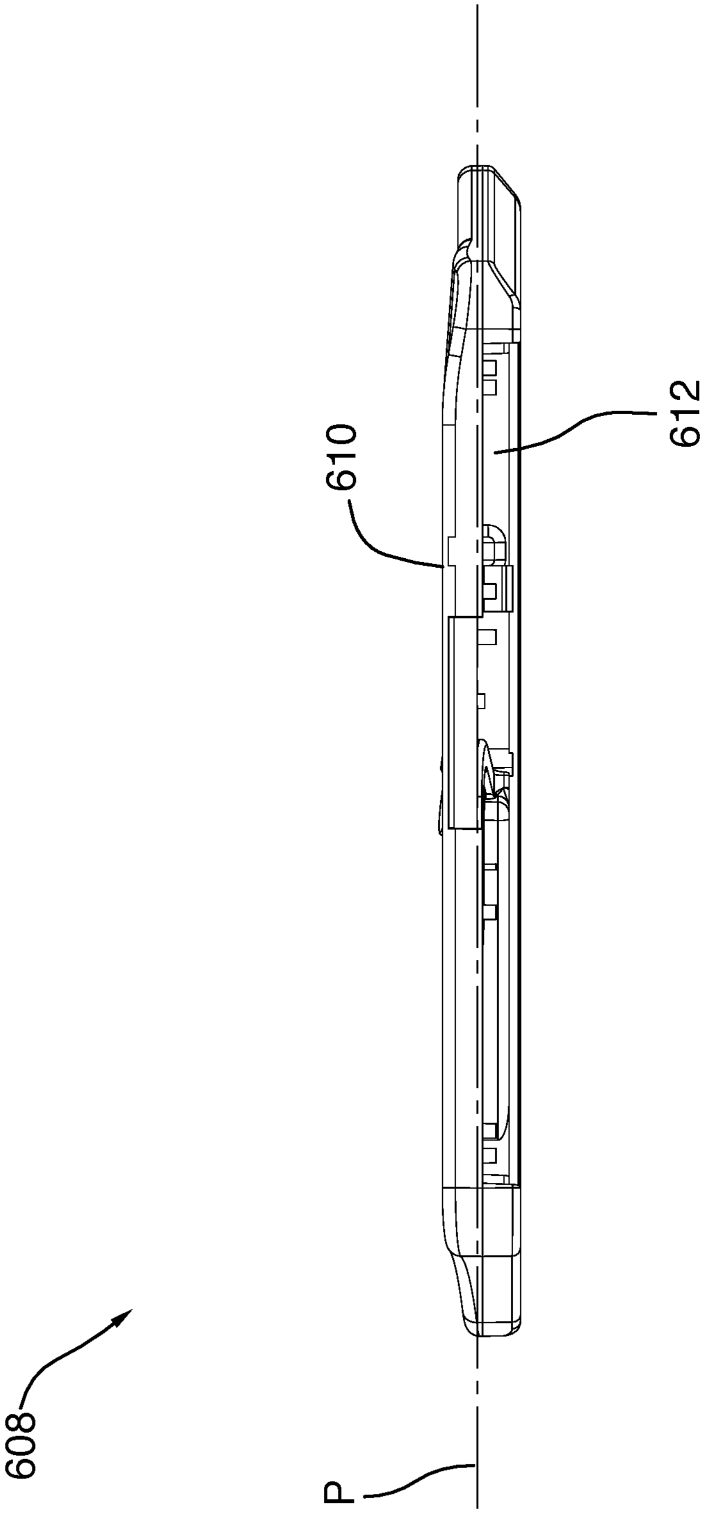
FIG. 17 is a bottom view of the siderail of FIG. 9.
Figure 18:
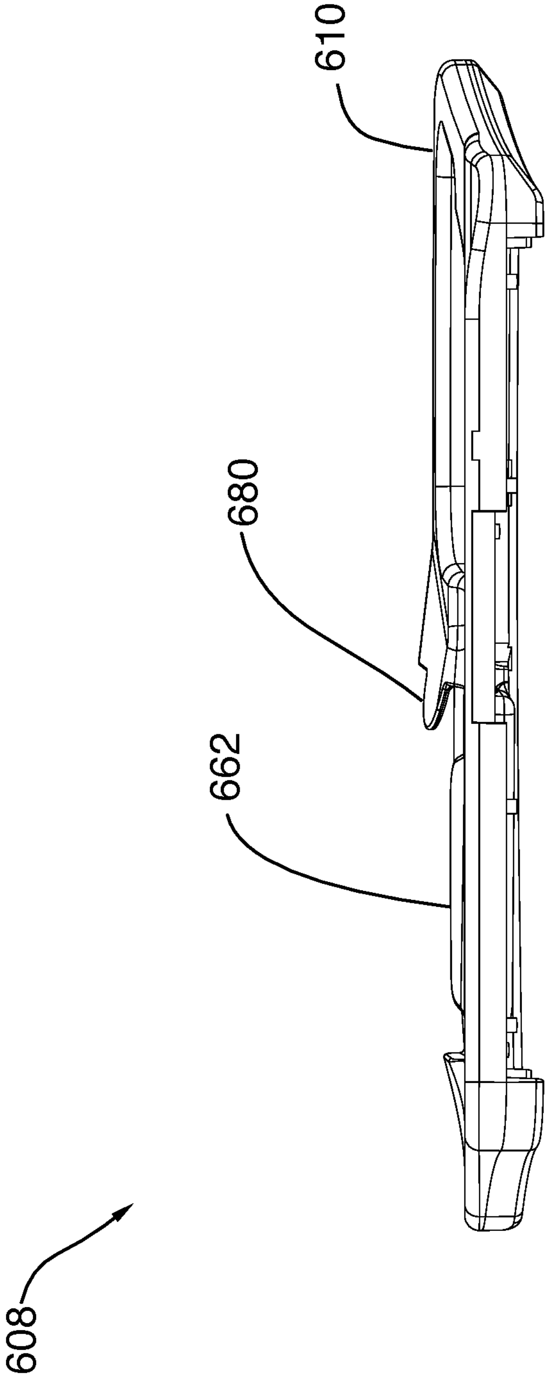
FIG. 18 is another bottom perspective view of the siderail of FIG. 9.
Figure 19:
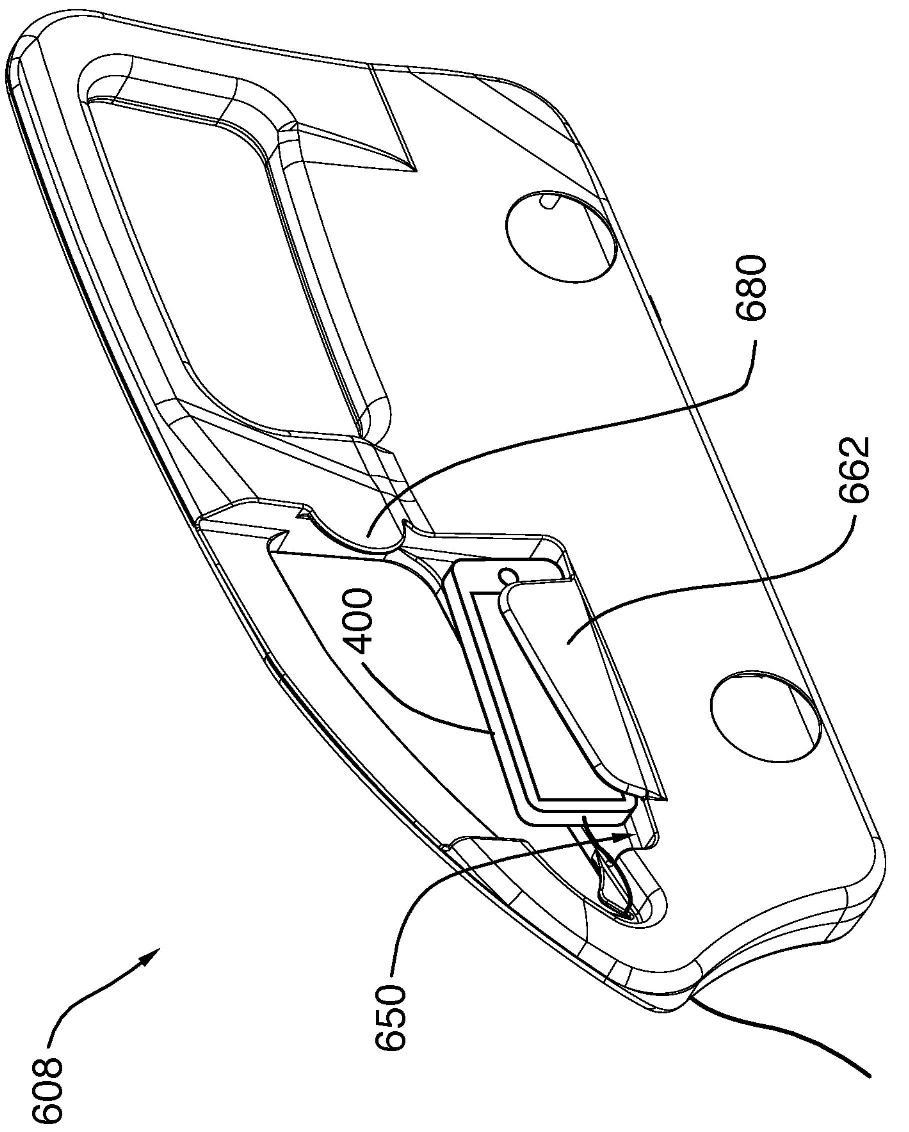
FIG. 19 is a perspective view of the siderail of FIG. 9 with a smartphone received in the hollow space.
Figure 20:
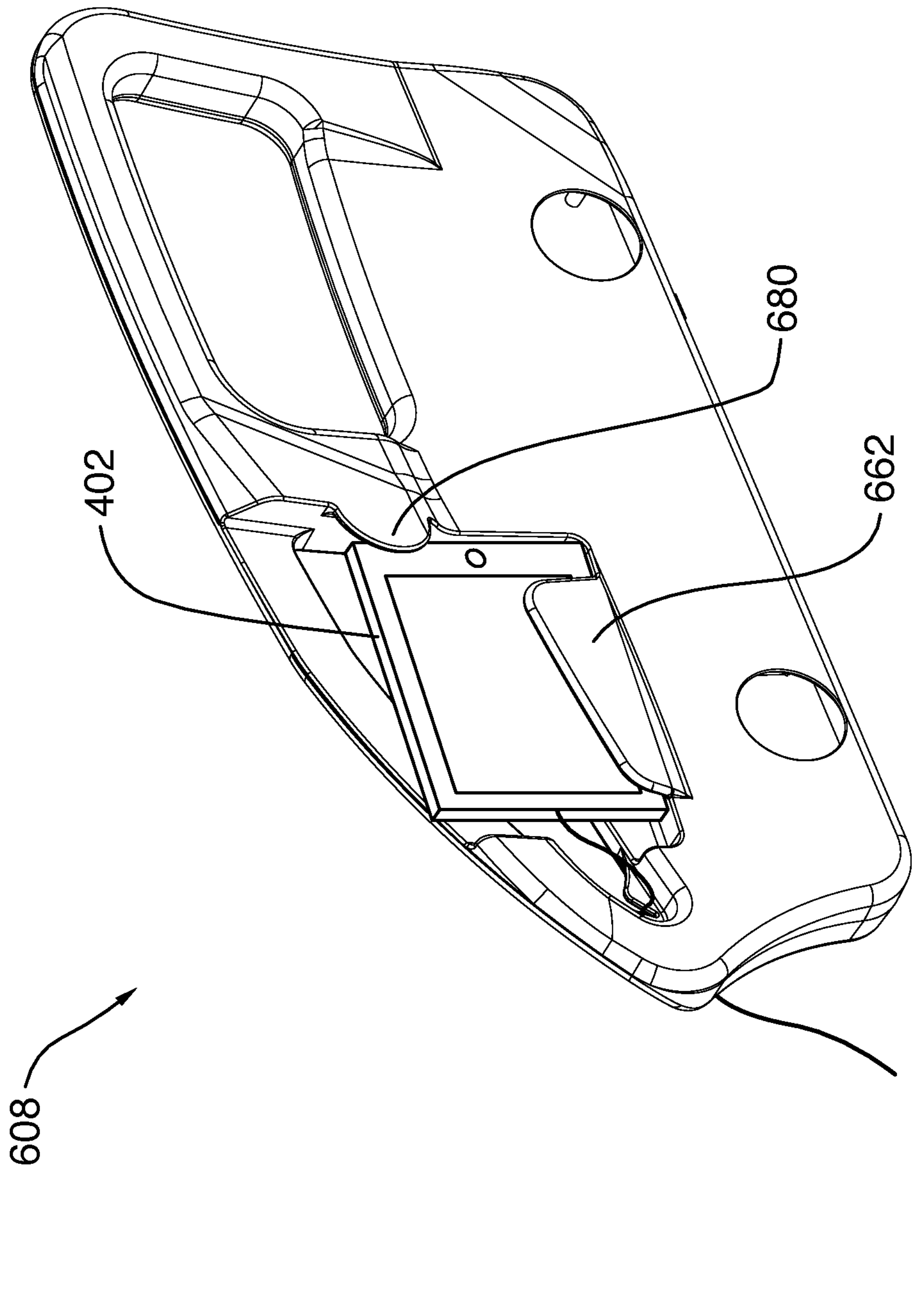
FIG. 20 is a perspective view of the siderail of FIG. 9 with a tablet received in the hollow space.
Figure 21:
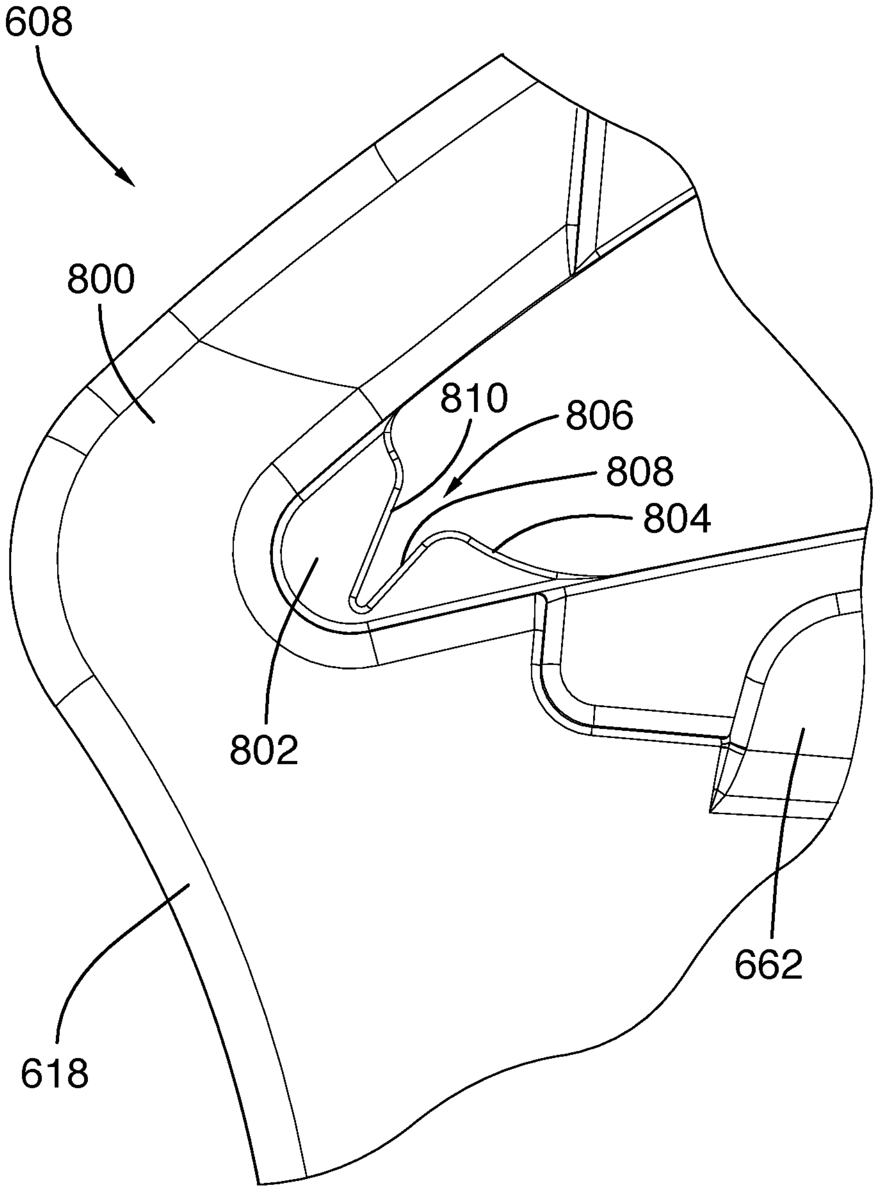
FIG. 21 is an enlarged view of a portion of the siderail of FIG. 9, for better showing an embodiment of a cable retaining device.

In use, when a backrest or a siderail adjacent the backrest of the patient support assembly is at an angle between 1° and 40° relative to the longitudinal axis, the electronic device 400 abuts against the top surface 318 of the bottom wall 316 and the front surface 334 of the rear wall 332, as shown in FIG. 7. When the backrest or the siderail is at an angle between 50° and 90° relative to the longitudinal axis, the electronic device 400 abuts against the top surface 318 of the bottom wall 316 and the rear surface 340 of the front wall 338, as shown in FIG. 8.

FIGS. 9 to 21 show a left siderail in accordance with another embodiment. The same description also applies to the right siderail, which is a mirror image of the left siderail. In an alternate embodiment, the right siderail could be configured differently than the left siderail.

The siderail 608 comprises a siderail body or panel and a locking assembly secured in a receiving space of the siderail 608. The locking assembly is used to selectively place the left siderail assembly in a locked position in which movement of the siderail is prevented and an unlocked position in which movement of the siderail is allowed.

The siderail 608 is generally planar and extends along a siderail plane P. The siderail 608 has an inner wall 610 located towards the bed and an outer wall 612 located opposite the inner wall 610. The siderail 608 further has a generally straight bottom edge 614, generally concave footward and headward edges 616, 618 extending upwardly from the bottom edge 614 and a curved top edge 620 which curves down at the rear to meet the headward edge 618.

The outer wall 612 is also generally planar and is generally parallel to the siderail plane P and includes a removable panel (not shown) for accessing the inner components of the locking assembly (not shown) secured in the receiving space of the siderail 608.

In the illustrated embodiment, the siderail 608 further includes a first opening 622 located adjacent the top edge 620, near the headward end 618, and a second opening 624 also located adjacent the top edge 620, near the footward edge 616. Both the first and second openings 622, 624 extend all the way through the siderail 608 between the inner wall 610 and the outer wall 612, and are surrounded by inner peripheral walls 623, 625 respectively. It will be appreciated that these openings 622, 624 allow the top edge 620 and the inner peripheral walls 623, 625 to be easily grabbed for displacing the bed on the floor or to facilitate the manipulation of the siderail when the siderail is pivoted or moved between the lowered and raised position. As such, the top edge 620 and the inner peripheral walls 623, 625 define grasping portions 627, 629 for manipulating the bed and/or the siderail or for providing additional support for a patient exiting or entering the bed.

The grasping portions 627, 629 are beveled when moving from the top of the top edge 620 to the inner peripheral walls 623, 625 such that the distance between the inner wall 610 and the outer wall 612 of the panel 608 increases in a smooth and gradual manner.

Unlike the outer wall 612, the inner wall 610 of the siderail has an irregular plane defining a hollow space 650. The hollow space 650 is integrally formed by walls of the siderail 608 and has a general shape of a recess extending from innermost surface 652 of the inner wall 610 toward the outer wall 612 (i.e., the compartment defined by the hollow space is recessed relative to the innermost surface 652) and comprises a slightly inclined straight bottom face 654, a headward face 656 extending upwardly from the bottom face 654, perpendicular thereto, and a footward face 658, also extending upwardly from the bottom face 654, spaced-apart from the headward face 656 and parallel thereto. Extending between the bottom, headward and footward faces 654, 656 and 658 is a generally flat back face 660, extending vertically and generally parallel to the plane of the outer wall 612. Together, the bottom, headward, footward faces and back faces 654, 656, 658, 660 collaborate to define a generally square storage space, slightly inclined downwardly when moving from the headward end 618 to the footward end 616. Indeed, in one embodiment, moving from the headward face 656 to the footward face 658, the bottom face 654 is inclined downwardly at an angle $\Theta_5$ relative to the plane parallel to the bottom edge 614 of the siderail 608, being understood that the bottom edge 614 of the siderail 608 is most of the time aligned with the horizontal (except, for instance when the bed is in a trendelenburg position or a reverse trendelenburg position). As such, instead of defining the angle $\Theta_5$ relative to a plane parallel to the bottom edge 614 of the siderail 608, the angle $\Theta_5$ could be defined relative to the horizontal, which may be better suited in embodiments where the bottom edge 614 of the siderail 608 is not configured to be aligned with the horizontal in normal or typical circumstances, or where the bottom edge 614 is irregular. In one embodiment, the angle $\Theta_5$ varies between 5° and 20° and is preferably an angle of 7° or an angle of 15°. As the headward and footward faces 656, 658 are perpendicular to the bottom face 654, they too are inclined at a corresponding angle, but relative to a vertical plane. In one embodiment, the bottom face 654 is further inclined downwardly at a slight angle in a transverse direction, i.e. downwardly from the back face 660 toward the innermost surface 652, so as to facilitate evacuation of liquids that may inadvertently fall in the hollow space 650, thus facilitating cleaning of the hollow space 650.

Extending upwardly at the junction of the bottom face 654 of the hollow space 650 and the innermost surface 652 of the siderail 608 is a lower projection 662. In the illustrated embodiment, the lower projection 662 has a lower end 664 attached to the innermost surface 652 and an upper end 666, and extends only partially between the headward and footward faces 656, 658, so as to leave headward and footward passages 670, 672 between the lower projection 662 and the headward and footward faces 656, 658 respectively, to facilitate evacuation of liquids, facilitate cleaning of the walls defining the hollow space 650, and allow electric cables to reach the hollow space 650. Further, thanks to the lower projection 662 extending upwardly and to the two passages 670, 672, the lower projection 662 can be used as a reeling device to reel the electric cable when the cable being used is overly long to avoid unnecessary encumbrance.

The lower projection 662 extends inwardly (i.e. toward the support surface 108 or the bed 100 or, in other words, away from the back surface of the hollow space 650), from the lower end 664 to the upper end 666. As it will be appreciated, this provides further space to position an electronic device 400 or 402 in the hollow space 650 and/or facilitate cleaning of the hollow space 650. The lower projection 662 is sized, shaped and configured for providing an abutment area engaging the back face or the screen of the electronic device 400 or 402 positioned in the hollow space 650 and maintain this electronic device in a generally upright position, regardless of whether the bottom, top or side edges of such electronic device are supported on the bottom face 654.

As it will be appreciated, the lower projection 662 may provide sufficient support for smaller electronic devices such as smartphones, but it may be desirable to provide further retaining features for larger devices such as tablets, to ensure they are properly maintained in the hollow space. Accordingly, in one embodiment, the siderail 608 further comprises a footward projection 680 extending at the junction of the footward face 658 and the innermost surface 652, toward the headward face 656. In the illustrated embodiment, the footward projection 680 is semi-circular and extends only partially between the bottom face 654 of the hollow space 650 and the top edge 620 of the siderail 608, in partial alignment with the opening 622. Much like the lower projection 662, the footward projection 680 extends inwardly (i.e., toward the support surface of the bed or, in other words, away from the back surface 660), from the end attached to the innermost surface 652 toward the opposed end. As it will be appreciated, this provides further space to position an electronic device in the hollow space 650 and/or facilitate cleaning of the parts defining the hollow space 650. The footward projection 680 is sized, shaped and configured for providing an abutment area engaging the back face or the screen of the electronic device positioned in the hollow space and maintain the electronic device in a generally upright position, regardless of whether the bottom, top or side edges of such electronic device are supported on the bottom face. For instance, when an electronic device is a tablet having dimensions such that it cannot be positioned in the hollow space 650 such that it rests on one of its side edges, it can be positioned to be supported on its top edge (i.e. upside down).

While in the illustrated embodiment, the siderail 608 comprises a lower projection 662 and a footward projection 680, it will be appreciated that a single projection could be used, whether it is the footward projection 680 or the lower projection 662, and that such projections can be configured, sized, shaped and positioned differently, or the siderail 608 could comprise further projections, without departing from the scope of the invention. For instance, in one embodiment, the siderail 608 comprises a headward projection 690, extending at the junction of the headward face 656 and the innermost surface 652, toward the footward face 658. In the illustrated embodiment, the headward projection 690 is hooked-shaped and extends only partially between the bottom face 654 and the top edge 620, in alignment with the grip portion 627 or handle of the siderail 608. Much like the lower projection 662 and the footward projection 680, the headward projection 690 extends inwardly (i.e. toward the support surface of the bed or, in other words, away from the back surface 660), from the end attached to the innermost surface 652 toward the opposed end extending in the hollow space 650. Like the footward projection 680, the headward projection 690 is sized, shaped and configured for providing an abutment area engaging the back face or the screen of the electronic device 400 or 402 positioned in the hollow space and maintain this electronic device in a generally upright position, regardless of whether the bottom, top or side edges of such electronic device are supported on the bottom face.

As it will be appreciated, when an electronic device such as a smartphone or tablet is positioned in the hollow space 650, the inclination of the bottom face 654 at the angle $\Theta_5$ and the corresponding inclination of the footward face 658, contribute to maintain the electronic device in engagement with the lower projection 662 and the footward projection 680, thanks to the gravitational force urging this electronic device toward the corner junction between the bottom face 654 and the footward face 658.

To plug or connect the electronic device 400 or 402 to the electric cable, the cable is passed from the outer face 612 of the siderail 608 toward the inner face 610 of the siderail 608, through opening 622, at which point it can be connected to the electrical socket (not shown) of the electronic device 400 or 402 housed in the hollow space 650. As it will be appreciated, when the electric cable or is disconnected from the electronic device 400 or 402, the gravitational force may however cause the electric cable to slide back through the opening 622, to fall on the ground or on the floor. As such, in one embodiment, the siderail 608 is further provided with a cable retention device 800 configured to retain the electric cable when it is disconnected from the electronic device 400 or 402, and for preventing the same from falling on the floor. In the illustrated embodiment, the cable retaining device 800 comprises a plate 802 extending partially in the opening 622 of the siderail 608, at the headward end 618 thereof. The plate 802 comprises a curved edge 804 and a V-shaped cut-out 806 with collaborating edges 808, 810 converging toward one another. The V-shaped cut-out 806 and its collaborating edges 808, 810 are configured for accommodating cables of various sizes while preventing the plugs at the device end of the cable to slide beyond the plate 802. In other words, to secure or attach the cable to cable retaining device 800, the electronic device end of the cable is passed through the opening 622 of the siderail 608, and the core of the cable is engaged in the V-shaped cut-out 806, until the core of the electric cable is engaged by the collaborating edges 808, 810, at which point the frictional engagement between the collaborating edges 808, 810 and the core of the electrical cable will prevent the electric cable from sliding outside the opening 622. In cases where such frictional engagement between the core of the electrical cable end the collaborating edges 808, 810 would be insufficient, the cable would slide outside the opening 622 until the plug at the electronic device end of the electrical cable engages the plate 802, due to the fact that such plug is wider (or larger) than the core of the electric cable. To remove the electric cable from the retaining device 800, the user simply disengages the electric cable from the V-shaped cutout 806 of the retaining devices 800. While in this embodiment, the cut-out 806 is V-shaped, it will be appreciated that it could have other shapes, such as a slot shape.

As it will be appreciated, it may be desirable to provide light to better locate the grasping portions (e.g. grasping portions 627, 629) of the various siderails during nighttime. However, the presence of light on the siderails may result in the patient discomfort as the lights may end up illuminating the patient's eyes or the eyes of patients in beds in the surrounding area, and thus create discomfort. Therefore, in one embodiment, the patient support barrier system generally disposed around the patient support assembly is provided with a nightlight system allowing the illumination of the gripping portions of one or multiple of the siderails without illuminating directly the eyes of the patent on the bed 100 or patients in surrounding beds.

Figure 22:
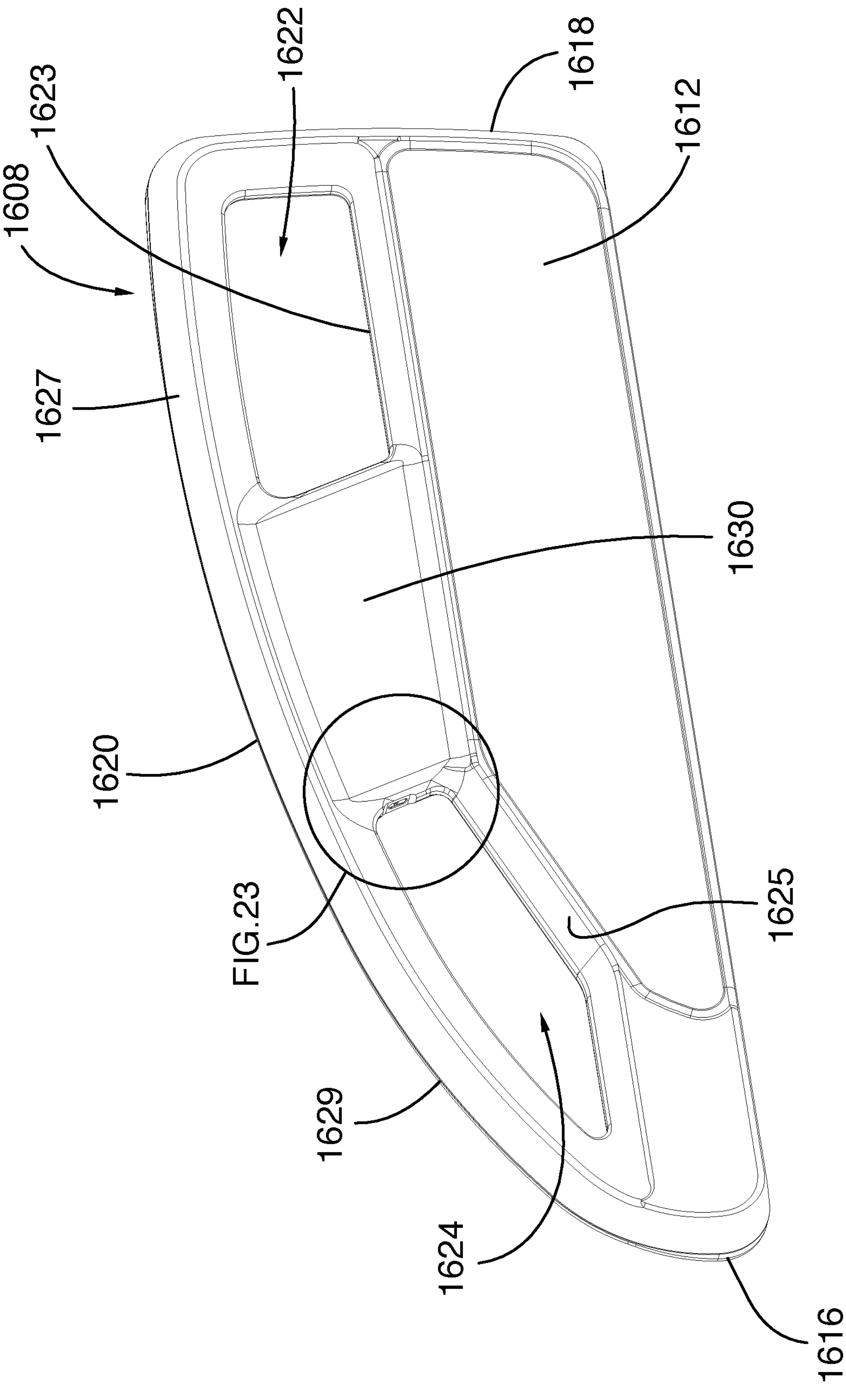
FIG. 22 is a perspective view of a siderail in accordance with a further embodiment, wherein the siderail comprises a light source.
Figure 23:
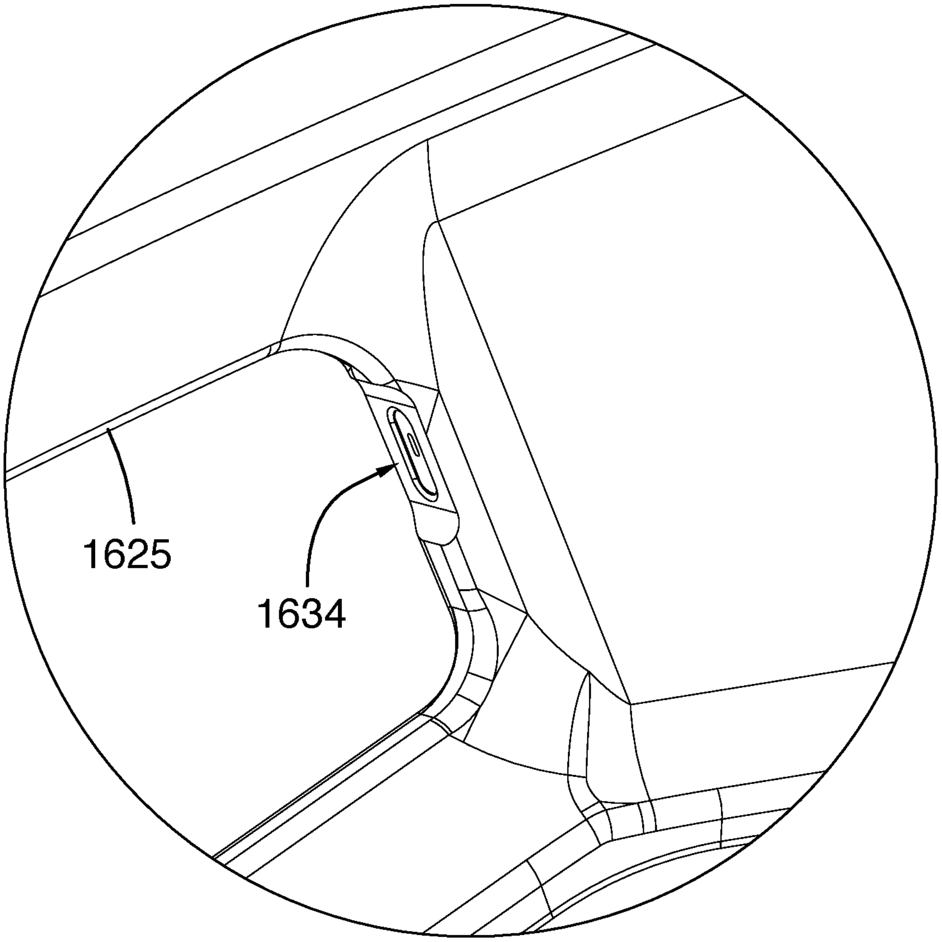
FIG. 23 is an enlarged view of a portion of the siderail of FIG. 22 for better showing the light source.
Figure 24:
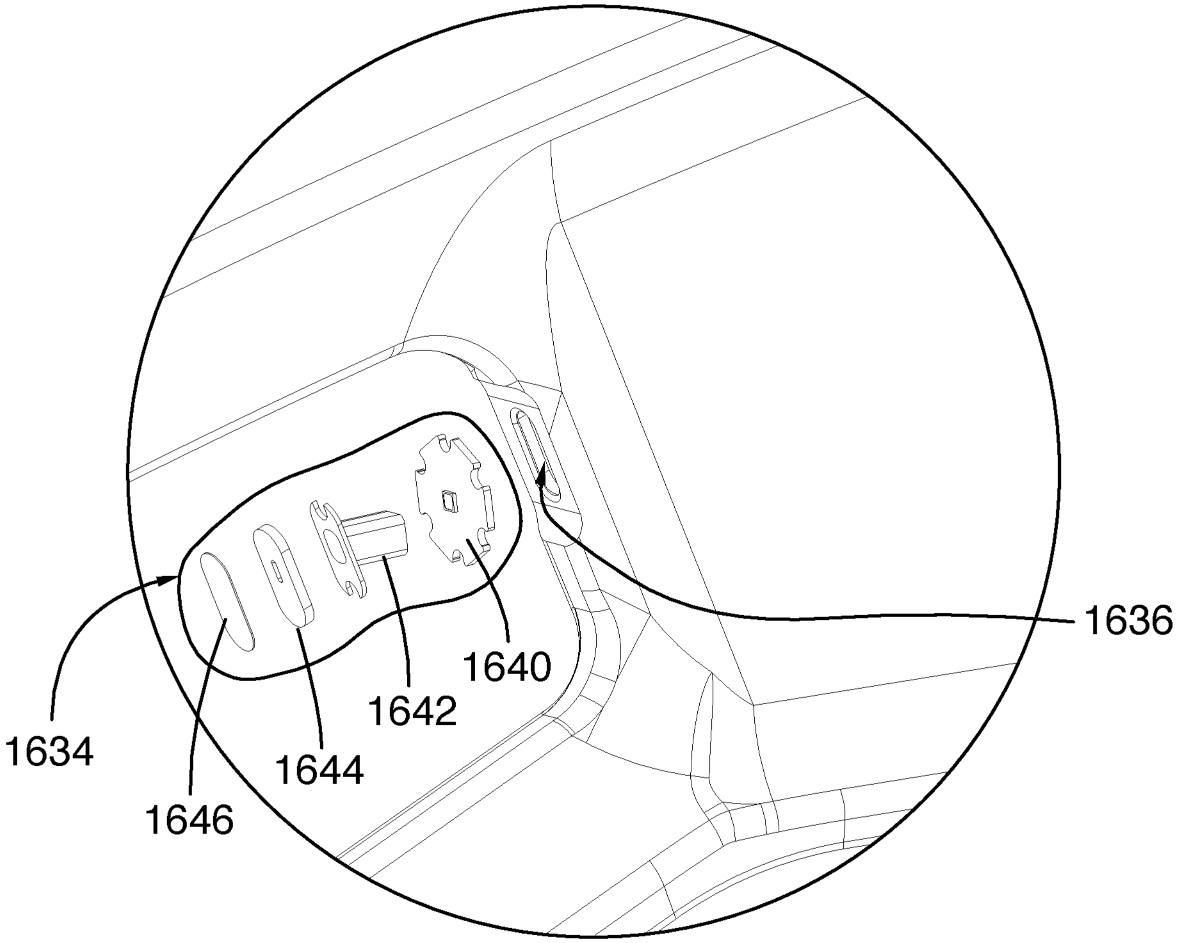
FIG. 24 is an exploded view of the light source.
Figure 25:
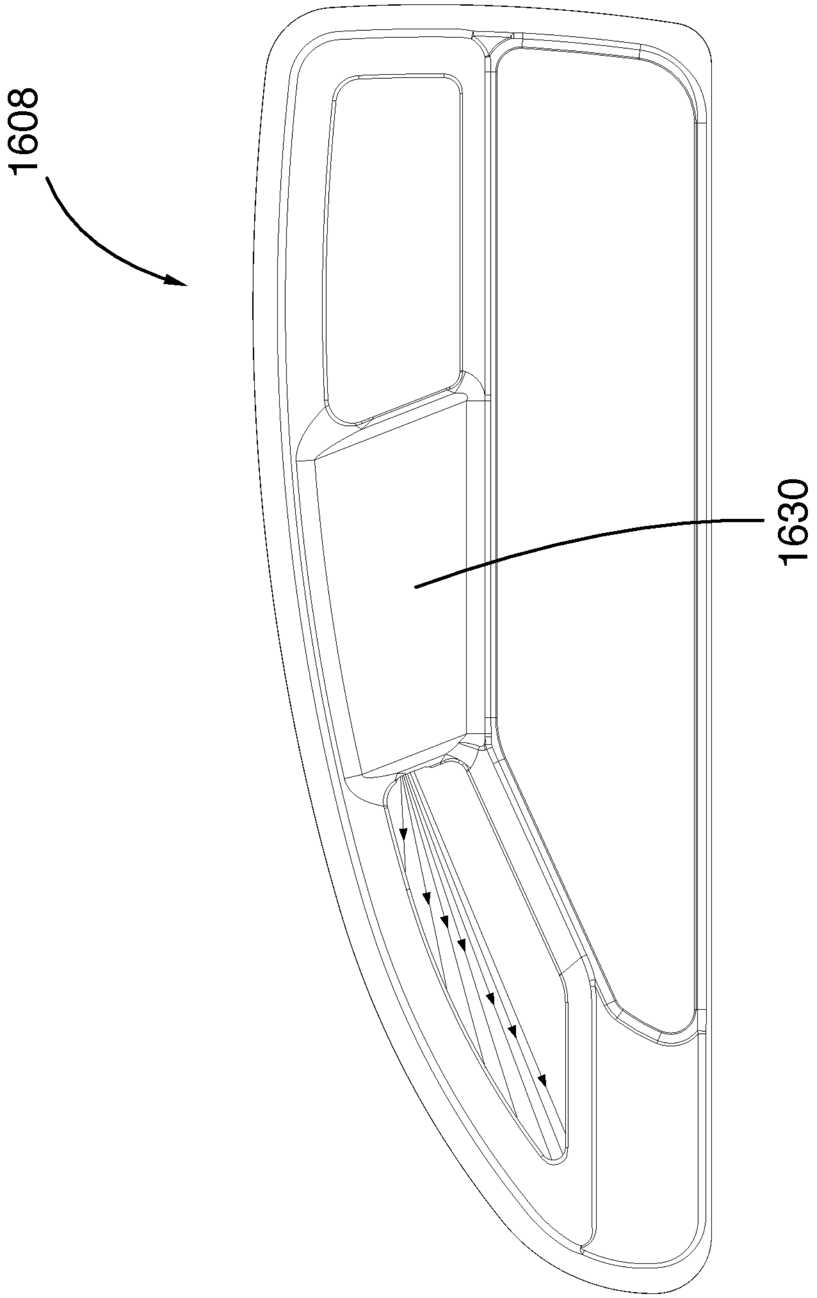
FIG. 25 is an elevational side view of a the siderail of FIG. 22 showing a light beam.

FIG. 22 shows a siderail 1608 in accordance with a further embodiment wherein a front opening 1624 is defined therebetween a front portion of a top edge of the panel of the siderail, a bottom surface of a front rail portion 1629, and a front surface of the middle wall 1630 of the siderail and wherein the front surface of the middle wall 1630 comprises a light source 1634 oriented towards a front edge 1616 of the siderail 1608 to illuminate the front portion of the top edge of the panel, the front opening 1624, and the front rail portion. FIG. 23 shows a portion of the siderail 1608 for better showing the light source 1634. FIG. 24 is an exploded view of the light source 1634. FIG. 25 is an elevational side view of a the siderail showing a light beam.

Much like the siderail 608, the siderail 1608 comprises a panel extending longitudinally between the rear and front edges of the siderail and extending upwardly from the bottom edge to the top edge of the siderail. The siderail 608 also comprises the middle wall 1630 extending upwardly from the top edge of the panel, the middle wall 1630 comprising a rear surface and a front surface.

The siderail 608 further comprises a top rail 1620 comprising a rear rail portion extending upwardly and forwardly from the rear edge of the siderail, the rear rail portion comprising a bottom surface and a top surface, a middle rail portion over the middle wall 1630, the middle rail portion comprising a top surface, and a front rail portion extending downwardly and forwardly up to the front edge of the siderail, the front rail portion comprising a bottom surface and a top surface, the top surfaces of the rear, middle and front rail portions defining grasping portions for the patient or a user.

The siderail 608 also comprises a first opening 1622 located adjacent the top rail 1620, near a headward edge 1618, and a second opening 1624 also located adjacent the top rail 1620, near the front edge 1616. The front or second opening 1624 is defined therebetween a front portion of the top edge of the panel, the bottom surface of the front rail portion, and the front surface of the middle wall 1630. The rear or first opening 1622 is defined therebetween a rear portion of the top edge of the panel, the bottom surface of the rear rail portion, and the rear surface of the middle wall 1630.

Both the first and second openings 1622, 1624 extend all the way through the siderail 1608 between an inner face 1610 and the outer face 1612, and are surrounded by inner peripheral walls 1623, 1625 respectively, and are divided by a middle wall 1630. It will be appreciated that these openings 1622, 1624 allow the top rail 1620 and the inner peripheral walls 1623, 1625 to be easily grabbed for displacing the bed on the floor or to facilitate the manipulation of the siderail assemblies when the siderail assemblies are pivoted or moved between the lowered and raised position. As such, the top rail 1620 and the inner peripheral walls 1623, 1625 define grasping portions 1627, 1629 for manipulating the bed and/or the siderail assemblies 126 or 128. It will also be appreciated that such grasping portions 1627, 1629 may be used by the patient or a user.

Mounted on the inner peripheral wall 1625, on the middle wall 1630, is a light source 1634 positioned and configured to illuminate the entire inner peripheral wall 1625 without illuminating outside of it to a level creating discomfort to the patient in the bed or surrounding beds. In one embodiment, the light source comprises one or multiple LED lights mounted to the middle wall and oriented towards the front edge 1616 of the siderail 1608. As it will be appreciated, the fact that the light source 1634 is oriented toward the front edge 1616 of the siderail 1608 means that the light is projected away from the eyes of the patient on the bed.

According to one embodiment, the light source 1634 is mounted in the middle wall 1630 and the middle wall 1630 comprises an internal channel with an opening 1636. The light source 1634 may comprise a LED light 1640, a reflector 1642 for concentrating and directing the light emitted by the LED Light 1640, an obturator 1644 for defining a light beam pattern toward the inner peripheral wall 1625 of the siderail assembly, as well as a lens 1646 adjacent to the obturator 1644, the lens 1646 being configured to close the opening 1636 of the middle wall 1630. The main function of the lens 1646 is to seal the opening 1636 of the middle wall 1630, but it could also play other functions in alternate embodiments. For instance, it could be used to modulate the characteristics of the light beam by altering the intensity of the light, by focusing the beam or changing its shape, by changing the color of the light.

The LED lights can be selected from "through hole" LED lights or printed circuit board (PCB) embedded LED lights, and can include LED lights of a single color (e.g. white light) or a plurality of colors (e.g. red, blue, green) to illuminated the peripheral wall 1625 with a single color or multiple colors, for instance varying colors depending on the status of the bed or of the patient (e.g. brakes locked, bed exist, etc.). In one embodiment, the light source 1634 is operatively coupled to an electric source, for instance the electric circuit of the bed 100, and to an ON/OFF switch allowing the light source to be selectively turned ON and OFF. Alternatively, the light source 1634 could be coupled to a controller, such as the controller or computer of the bed 100, to adjust the activation of the light source 1634, the intensity of the light projected and/or to control the color thereof, depending on the status of the bed. As it will be appreciated, and although the light source 1634 has been described in connection with middle wall 1630 and openings 1624 of head side rail assemblies, light source 1634 could be mounted elsewhere on the siderail assemblies. For instance, instead of being mounted to illuminate inner peripheral wall 1625 of opening 1624 of siderail assemblies, they could instead, or in addition, be mounted to illuminate inner peripheral wall 1623 of opening 1622 of siderails assemblies, and/or peripheral walls 623 or 625 of openings 622 or 624 of siderail assemblies.

Figure 26:
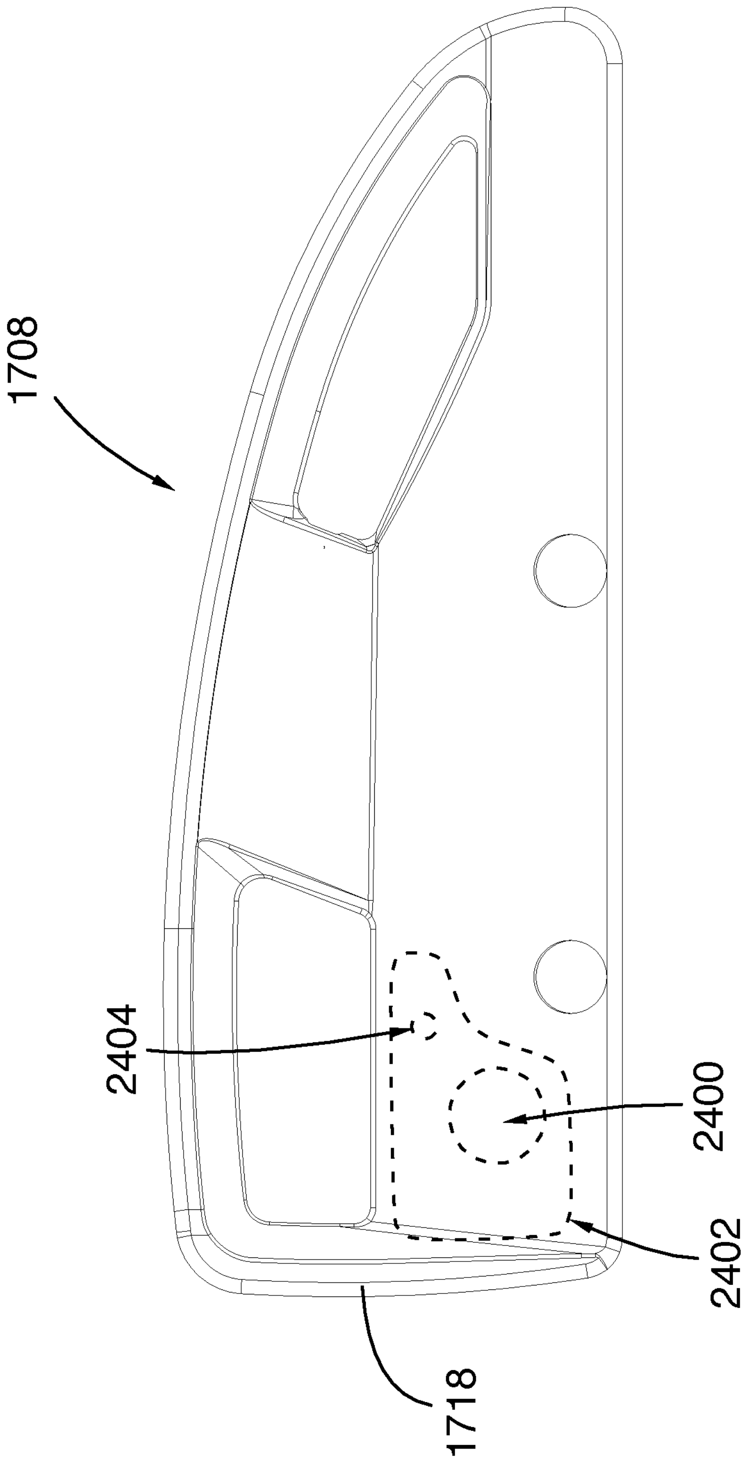
FIG. 26 is an elevational side view of a siderail in accordance with another embodiment, wherein the panel of the siderail comprises a speaker for emitting sounds towards the patient's head.

FIG. 26 shows a siderail 1708 in accordance with another embodiment wherein the panel of the siderail comprises a rear or head portion adjacent the rear or head edge of the siderail, wherein the rear portion of the panel comprises a speaker 2400 for emitting sounds towards the patient's head (sounds such as music, voice, alarm and any other type of sound that can be emitted by a speaker). As it will be appreciated, the speaker 2400 can serve many functions, including but not limited to allowing the patient to watch TV (by providing the sound component thereof), to listen to the radio, podcasts, audiobooks and the like, playing an intercom function to broadcast messages to patients or by allowing two-way communication between patient and nursing staff from the control panel. Further, the speaker 2400 could be used to amplify the sound of the tablet, smartphone or other personal handheld device stored in the hollow space or connected to the bed.

In one embodiment, the speaker is configured and positioned on (or in) the siderail assembly such that the sound signal emitted is audible for the patient resting on the bed without creating an excessive "noise pollution" level for other occupants of a room. As such, the speaker 2400 is preferably oriented toward the resting surface of the bed, and ideally closer to the head of the patient (i.e. closer to the head end 1718). As it will be apparent, in such an embodiment, the speaker 2400 would be positioned in the head siderail assembly, as opposed as in the foot siderail assembly for instance. In other embodiments, the bed could be provided with multiple speakers such as speaker 2400, for instance one speaker in each of the head siderail assemblies, and optionally with speakers on the headboard to project sound signal on each side of the patient's head.

In one embodiment, the speaker 2400 is dimensioned to be easily integrated in the space available on/in the siderail. As such, a smaller speaker is preferable. Further, it will be understood that a siderail assembly could include a set of speakers (e.g. two or three speakers) positioned at different place on/in the siderail. Further, the speaker 2400 is preferably configured to be concealed (i.e. no significant openings are necessary or created) such that the cleaning and disinfection are not rendered more complex by the presence of the speaker 2400. However, known speaker technologies tend to require an opening between the speaker and its environment, to allow the propagation of sound.

Therefore, in one embodiment, the speaker comprises a "conventional" speaker (that is to say a speaker with an oscillating magnet operatively coupled to a cone and causing the same to vibrate to produce a sound wave) mounted to the siderail assembly such that it can propagate sound while being provided with a physical barrier avoiding direct access between the speaker 2400 and the outside of the siderail assembly. In this embodiment, the speaker is mounted inside the siderail and oriented toward the patient surface, with an opening being defined in the body of the siderail, which opening is conceal with a film or membrane 2402 of another plastic material, sealing internal components of the siderail. As such, the speaker 2400 is positioned behind the thin plastic film 2400, itself sealed or glued on the periphery on the siderail of the bed, thus allowing the propagation of sound while facilitating cleaning and disinfection.

In an alternate embodiment, the speaker comprises an "exciter" type speaker. An exciter speaker (also known as a "bodyshaker" speaker) is essentially a speaker without a membrane. It mainly consists of 3 components, namely an oscillating mass or magnet, the contact pins to connect the speaker to the amplifier, and a mounting plate to hook up the speaker to a surface to be excited. By applying a voice, music or other sound signal to the contact pins, the oscillating mass oscillates with the frequency of the applied signal and the oscillation is sequentially transmitted to the mounting plate and then to the surface the exciter is attached to, thereby propagating the sound signal. Therefore, in this embodiment, a exciter speaker can be glued on an internal wall of the bed siderail. As it will be appreciated, the exciter speaker can be positioned on the siderail such that the sound is primarily oriented toward the head of the patient resting on the bed.

To allow a two-way communication between the bed and the hospital network (e.g. a nurse station), the bed can be provided with a microphone 2404. Much like for the speaker 2400, it may be advantageous to conceal the microphone 2404 and/or to configure a microphone opening such that the cleaning and disinfection are not rendered more complex by the presence of the microphone.

As such, in one embodiment, the microphone 2404 comprises a miniature microphone strategically positioned on the siderail to capture and transmit the voice of the patient or a sound emitted in the immediate environment of the bed, for instance a microphone of the type used in smartphones and tablets (e.g. MEMS technology). In an alternate embodiment, instead of using a discrete or separate microphone, the speaker 2400 could be used to achieve both a sound-emitting function and a microphone function, thanks to the inherent capability of most speakers to capture or pick up ambient sounds and convert them into electrical signals.

Also, it will be appreciated that the various features herein described, including the hollow spaces 330, 650 defined by portions of the siderail to receive the electronic device 400, the grasping portions 627, 629, 1627, 1629, the light source 1634, the speaker 2400 and the microphone 2404 could be used together or separately, and that multiple variations and permutations are possible. For instance, features could be found on separate siderails. Further, they could be found, together or separately, on the foot siderails rather than on the head panels, and the person skilled in the art will appreciate that multiple configurations of left, right, head and foot siderails are possible without departing from the scope of the invention.

The above description of the variants, examples or embodiments should not be interpreted in a limiting manner since other variations, modifications and refinements are possible within the scope of the present invention. Accordingly, it should be understood that various features and aspects of the disclosed variants or embodiments can be combined with or substituted for one another in order to form varying modes of the disclosed invention. For example, and without limitation, any individual element of the described variants or embodiments may be replaced by alternative elements that provide substantially similar functionality or otherwise provide adequate operation. This includes, for example, presently known alternative elements, such as those that might be currently known to a skilled person in the art, and alternative elements that may be developed in the future, such as those that a skilled person in the art might, upon development, recognize as an alternative. The scope is defined in the appended claims and their equivalents.

The invention claimed is:

1. A bed for a patient, the bed extending longitudinally along a longitudinal axis between a head or rear end and a foot or front end and extending transversely along a transversal axis between a left side and right side, the bed comprising:

a patient support assembly comprising a patient surface for supporting the patient;

a first frame, the patient support assembly being mounted to the first frame;

a base frame comprising a head member and a foot member, the first frame being mounted to the base frame; and a siderail comprising a bottom edge, a top edge, a rear edge, a front edge, and a panel extending longitudinally between the rear edge and the front edge and extending upwardly from the bottom edge to the top edge, the panel comprising:

an inner wall facing the patient surface, an outer wall opposite the inner wall, a bottom wall extending along the inner wall and inwardly towards the patient surface, the bottom wall comprising:

a first end, a second end, a substantially planar top surface extending from the first end to the second end, an inner surface facing the patient surface, and an inner projection extending upwardly from a portion of the bottom wall and spaced from each of the first end and the second end, the inner projection comprising:

a top edge, an outer surface facing the patient surface, and an inner surface facing a portion of the inner wall;

wherein a hollow space to receive an electronic device is defined by the top surface of the bottom wall, the inner surface of the inner projection, and a portion of the inner wall, the bottom wall extending along the inner wall towards the top edge at an angle between 20° and 40° relative to the longitudinal axis.

2. The bed of claim 1, wherein the inner projection is integrally molded with the bottom wall.

3. The bed of claim 1, wherein the inner projection is secured to the bottom wall.

4. The bed of claim 1, wherein the inner surface is a first inner surface, wherein the panel comprises;

a rear wall extending upwardly along the inner wall and inwardly towards the patient surface, the rear wall comprising a front surface and a second inner surface facing the patient surface, wherein the rear wall and the bottom wall are joined together at a rear corner, wherein the hollow space is defined therebetween between the front surface of the rear wall, the top surface of the bottom wall, the first inner surface of the inner projection, and the portion of the inner wall.

5. The bed of claim 4, comprising at least one feature selected from a group consisting of: the rear wall extending upwardly along the inner wall over a length between 70 mm and 125 mm, the rear wall extending upwardly at an angle between 50° and 70° relative to the longitudinal axis, the front wall extending upwardly along the inner wall over a length between 35 mm and 65 mm, the front wall extending upwardly at an angle between 50° and 70° relative to the longitudinal axis, the bottom wall extending inwardly toward the patient surface over a length between 10 mm and 15 mm, the bottom wall extending upwardly along the inner wall over a length between 175 mm and 200 mm, the bottom wall extends inwardly and downwardly towards the patient surface at an angle between 2° and 8° relative to the transversal axis, the portion from which the inner projection extends having a length between 100 mm and 150 mm, and the inner projection extending upwardly up to the top edge of the inner projection over a length between 30 mm and 50 mm.

6. The bed of claim 4, comprising a backrest for supporting a patient's head, wherein, when the backrest is at an angle between 1° and 40° relative to the longitudinal axis, the electronic device abuts against the top surface of the bottom wall and the front surface of the rear wall.

7. The bed of claim 1, wherein the inner surface is a first inner surface, wherein the panel comprises:

a front wall extending upwardly along the inner wall and inwardly towards the patient surface, the front wall comprising a rear surface and a second inner surface facing the patient surface, wherein the front wall and the bottom wall are joined together at a front corner, wherein the hollow space is defined between the rear surface of the front wall, the front surface of the rear wall, the top surface of the bottom wall, the first inner surface of the inner projection, and the portion of the inner wall.

8. The bed of claim 7, comprising a backrest for supporting a patient's head, wherein, when the backrest is at an angle between 50° and 90° relative to the longitudinal axis, the electronic device abuts against the top surface of the bottom wall and the rear surface of the front wall.

9. The bed of claim 1, wherein the portion of the inner wall is a recessed portion defined by inner wall portions of the inner wall.

10. The bed of claim 1, comprising:

a first mounting member and a second mounting member mounted to the patient support assembly or the frame, and a first connecting arm and a second connecting arm between (i) the siderail and (ii) the first mounting member and the second mounting member, wherein the first connecting arm comprises:

a first top end pivotably connected to the siderail and comprising a first top projection extending along a first top pivot axis, a first bottom end pivotably connected to the first mounting member and comprising a first bottom projection extending along a first bottom pivot axis;

wherein the second connecting arm comprises:

a second top end pivotably connected to the siderail and comprising a second top projection extending along a second top pivot axis, a second bottom end pivotably connected to the second mounting member and comprising a second bottom projection extending along a second bottom pivot axis.

11. The bed of claim 10, wherein, the first and second connecting arms pivot relative to the siderail about the first and second top pivot axes and relative to the first and second mounting members about the first and second bottom pivot axes to allow the siderail to pivot along an arcuate path relative to the first and second mounting members when pivoting between a lowered position and a raised position, and wherein the first top pivot axis, the second top pivot axis, the first bottom pivot axis, and the second bottom pivot axis are parallel to each other and angled downwardly relative to a horizontal plane such that, in use, the first connecting arm and the second connecting arm are in an arm plane that is angled outwardly from the patient support assembly when the siderail is in the raised position.

12. The bed of claim 1, wherein the inner projection comprises a rear edge and a front edge, wherein the rear edge, the top edge, or the front edge of the inner projection comprises a hook for at least partially retaining a cable of the electronic device.

13. A bed for a patient, the bed extending longitudinally along a longitudinal axis between a head or rear end and a foot or front end and extending transversely along a transversal axis between a left side and right side, the bed comprising:

- a patient support assembly comprising a patient surface for supporting the patient;
- a first frame, the patient support assembly being mounted to the first frame; and
- a siderail assembly comprising:
  - a siderail comprising:
    - an inner wall facing the patient surface,
    - an outer wall opposite the inner wall,
    - a bottom edge,
    - a top edge,
    - a bottom wall extending along the inner wall and inwardly towards the patient surface, the bottom wall comprising: a top surface, an inner surface facing the patient surface, a first end, and a second end, and
    - an inner projection extending upwardly from a portion of the bottom wall, the inner projection comprising a top edge, an outer surface facing the patient surface, and an inner surface facing a portion of the inner wall, wherein the inner projection is spaced from the first end and the second end,
  - a mounting member mounted to the patient support assembly or the first frame, and
  - a connecting arm between the siderail and the mounting member;
- wherein a hollow space to receive an electronic device is defined between the top surface of the bottom wall, the inner surface of the inner projection and the portion of the inner wall, the bottom wall extending along the inner wall towards the top edge at an angle between 20° and 40° relative to the longitudinal axis.

14. The bed of claim 13, wherein the inner projection is integrally molded with the bottom wall.

15. The bed of claim 13, wherein the inner projection is secured to the bottom wall.

16. The bed of claim 13, wherein the panel comprises a rear wall extending upwardly along the inner wall and inwardly towards the patient surface, the rear wall comprising a front surface and an inner surface facing the patient surface, wherein the rear wall and the bottom wall are joined together at a rear corner, wherein the hollow space is defined between the front surface of the rear wall, the top surface of the bottom wall, the inner surface of the inner projection, and the portion of the inner wall.

17. The bed of claim 16, comprising at least one feature selected from a group consisting of: the rear wall extending upwardly along the inner wall over a length between 70 mm and 125 mm, the rear wall extending upwardly at an angle between 50° and 70° relative to the longitudinal axis, the front wall extending upwardly along the inner wall over a length between 35 mm and 65 mm, the front wall extending upwardly at an angle between 50° and 70° relative to the longitudinal axis, the bottom wall extending inwardly toward the patient surface over a length between 10 mm and 15 mm, the bottom wall extending upwardly along the inner wall over a length between 175 mm and 200 mm, the bottom wall extends inwardly and downwardly towards the patient surface at an angle between 2° and 8° relative to the transversal axis, the portion from which the inner projection extends having a length between 100 mm and 150 mm, and the inner projection extending upwardly up to the top edge of the inner projection over a length between 30 mm and 50 mm.

18. The bed of claim 16, further comprising a backrest for supporting a patient's head, wherein, when the backrest is at an angle between 1° and 40° relative to the longitudinal axis, the electronic device abuts against the top surface of the bottom wall and the front surface of the rear wall.

19. The bed of claim 13, wherein the panel comprises a front wall extending upwardly along the inner wall and inwardly towards the patient surface, the front wall comprising a rear surface and an inner surface facing the patient surface, wherein the front wall and the bottom wall are joined together at a front corner, wherein the hollow space is defined between the rear surface of the front wall, the front surface of the rear wall, the top surface of the bottom wall, the inner surface of the inner projection, and the portion of the inner wall.

20. The bed of claim 19, further comprising a backrest for supporting a patient's head, wherein, when the backrest is at an angle between 50° and 90° relative to the longitudinal axis, the electronic device abuts against the top surface of the bottom wall and the rear surface of the front wall.

21. The bed of claim 13, wherein the portion of the inner wall is a recessed portion defined by inner wall portions of the inner wall.

22. The bed of claim 13, wherein the mounting member is a first mounting member and the connecting arm is a first connecting arm, the bed comprising a second mounting member mounted to the patient support assembly or the first frame and a second connecting arm between the siderail and the second mounting member,

- wherein the first connecting arm comprises a first top end pivotably connected to the siderail and a first bottom end pivotably connected to the first mounting member, the first top end comprising a first top projection extending along a first top pivot axis, and the first bottom end comprising a first bottom projection extending along a first bottom pivot axis;
- wherein the second connecting arm comprises a second top end pivotably connected to the siderail and a second bottom end pivotably connected to the second mounting member, the second top end comprising a second top projection extending along a second top pivot axis, and the second bottom end comprising a second bottom projection extending along a second bottom pivot axis.

23. The bed of claim 22, wherein, the first connecting arm and the second connecting arm pivot (i) relative to the siderail about the first top pivot axis and the second top pivot axis and (ii) relative to the first mounting member and the second mounting member about the first bottom pivot axis and the second bottom pivot axis to allow the siderail to pivot along an arcuate path relative to the first mounting member and the second mounting member when pivoting between a lowered position and a raised position, and

- wherein the first top pivot axis, the first bottom pivot axis, the second top pivot axis, and the second bottom pivot axis are parallel to each other and angled downwardly relative to a horizontal plane such that, in use, the first connecting arm and the second connecting arm are in an arm plane that is angled outwardly from the patient support assembly when the siderail is in the raised position.

24. The bed of claim 13, wherein the inner projection comprises a rear edge and a front edge, wherein the rear edge, top edge, or front edge of the inner projection comprises a hook for at least partially retaining a cable of the electronic device.

25. A siderail for a bed for a patient, the bed extending longitudinally along a longitudinal axis between a head or rear end and a foot or front end and extending transversely along a transversal axis between a left side and right side, the bed comprising:

a patient support assembly comprising a patient surface for supporting the patient, a frame, the patient support assembly being mounted to the frame, a siderail comprising:

an inner wall facing the patient surface, an outer wall opposite the inner wall, a bottom edge, a first top edge, a first inner projection extending upwardly and being spaced from the inner wall, the first inner projection comprising a second top edge, a first outer surface facing the patient surface, and a first inner surface facing a portion of the inner wall, a bottom wall extending along the inner wall and inwardly towards the patient surface, the bottom wall comprising a top surface and a second inner surface facing the patient surface, a front wall extending along the inner wall, inwardly towards the patient surface, and upwardly from the bottom wall, the front wall comprising a front surface and a third inner surface facing the patient surface, and a second inner projection extending from the front wall and being spaced from the inner wall and the bottom wall, the second inner projection comprising a third top edge, a second outer surface facing the patient surface, and a second inner surface facing a portion of the inner wall, wherein the second inner projection extends in a direction transverse to the first inner projection;

wherein the first inner projection extends from a portion of the bottom wall, the bottom wall extending along the inner wall towards the top edge at an angle between 20° and 40° relative to the longitudinal axis, wherein a hollow space to receive an electronic device is defined between the top surface of the bottom wall, the first inner surface, and the portion of the inner wall.

26. The siderail of claim 25, wherein the inner projection is integrally molded with the bottom wall.

27. The siderail of claim 25, wherein the inner projection is secured to the bottom wall.

28. The siderail of claim 25, wherein the siderail comprises a rear wall extending upwardly along the inner wall and inwardly, the rear wall comprising a front surface and an inner surface facing the patient surface, wherein the rear wall and the bottom wall are joined together at a rear corner, wherein the hollow space is defined between the front surface of the rear wall, the top surface of the bottom wall, the inner surface of the inner projection and the portion of the inner wall.

29. The siderail of claim 25, the front wall further comprising a rear surface and an inner surface facing the patient surface, wherein the front wall and the bottom wall are joined together at a front corner, wherein the hollow space is defined between the rear surface of the front wall, the front surface of the rear wall, the top surface of the bottom wall, the inner surface of the inner projection and the portion of the inner wall.

30. The siderail of claim 28, comprising at least one feature selected from a group consisting of: the rear wall extending upwardly along the inner wall over a length between 70 mm and 125 mm, the rear wall extending upwardly at an angle between 50° and 70° relative to the longitudinal axis, the front wall extending upwardly along the inner wall over a length between 35 mm and 65 mm, the front wall extending upwardly at an angle between 50° and 70° relative to the longitudinal axis, the bottom wall extending inwardly toward the patient surface over a length between 10 mm and 15 mm, the bottom wall extending upwardly along the inner wall over a length between 175 mm and 200 mm, the bottom wall extends inwardly and downwardly towards the patient surface at an angle between 2° and 8° relative to the transversal axis, the portion from which the inner projection extends having a length between 100 mm and 150 mm, and the first inner projection extending upwardly up to the top edge of the first inner projection over a length between 30 mm and 50 mm.

31. The siderail of claim 25, wherein the first inner projection comprises a rear edge and a front edge, wherein the rear edge, top edge, or front edge of the first inner projection comprises a hook for at least partially retaining a cable of the electronic device.

32. The siderail of claim 25, wherein the portion of the inner wall is a recessed portion defined by inner wall portions of the inner wall.

* * * * *